(12) United States Patent
Saebi

(10) Patent No.: US 7,822,584 B1
(45) Date of Patent: *Oct. 26, 2010

(54) METHOD OF PERFORMING A FINITE ELEMENT ANALYSIS OF A COMPOSITE STRUCTURE

(76) Inventor: Nasser Saebi, 18231 N. 66th La., Glendale, AZ (US) 85308

(*) Notice: Subject to any disclaimer, the term of this patent is extended or adjusted under 35 U.S.C. 154(b) by 361 days.

This patent is subject to a terminal disclaimer.

(21) Appl. No.: 11/906,202

(22) Filed: Sep. 29, 2007

Related U.S. Application Data

(60) Provisional application No. 60/848,554, filed on Sep. 30, 2006.

(51) Int. Cl.
G06F 17/50 (2006.01)
(52) U.S. Cl. .......................................... 703/1
(58) Field of Classification Search .............. 703/1
See application file for complete search history.

(56) References Cited

U.S. PATENT DOCUMENTS

| | | | |
|---|---|---|---|
| 6,205,728 B1* | 3/2001 | Sutelan | 52/309.7 |
| 6,721,684 B1* | 4/2004 | Saebi | 702/183 |
| 7,107,193 B1* | 9/2006 | Hummel et al. | 703/2 |
| 7,561,995 B2* | 7/2009 | Willis et al. | 703/6 |
| 2002/0133319 A1* | 9/2002 | Tang | 703/1 |
| 2003/0154451 A1* | 8/2003 | Rassaian | 716/4 |
| 2004/0122630 A1* | 6/2004 | Fife | 703/2 |
| 2005/0022152 A1* | 1/2005 | Turk et al. | 717/100 |
| 2007/0074480 A1* | 4/2007 | Kleila et al. | 52/720.1 |

FOREIGN PATENT DOCUMENTS

JP 2006164113 A * 6/2006

* cited by examiner

*Primary Examiner*—Paul L Rodriguez
*Assistant Examiner*—Aniss Chad
(74) *Attorney, Agent, or Firm*—Albert W Davis, Jr.

(57) ABSTRACT

The invention provides a method of analyzing a building made from Expanded Poly Styrene (EPS) which is coated on the inside and outside with Glass Fiber Reinforced Concrete (GFRC) or other strengthening coating. The building is designed in a CAD program. Then, the building is divided up into small volumes in the CAD program or in a Finite Element Analysis program using an automeshing program. Plates are added to the inner and outer surfaces of the volumes using copying and automeshing commands. Appropriate characteristics of the EPS and GFRC are assigned to the volumes and plates. A FEA analysis can then be run.

4 Claims, 30 Drawing Sheets

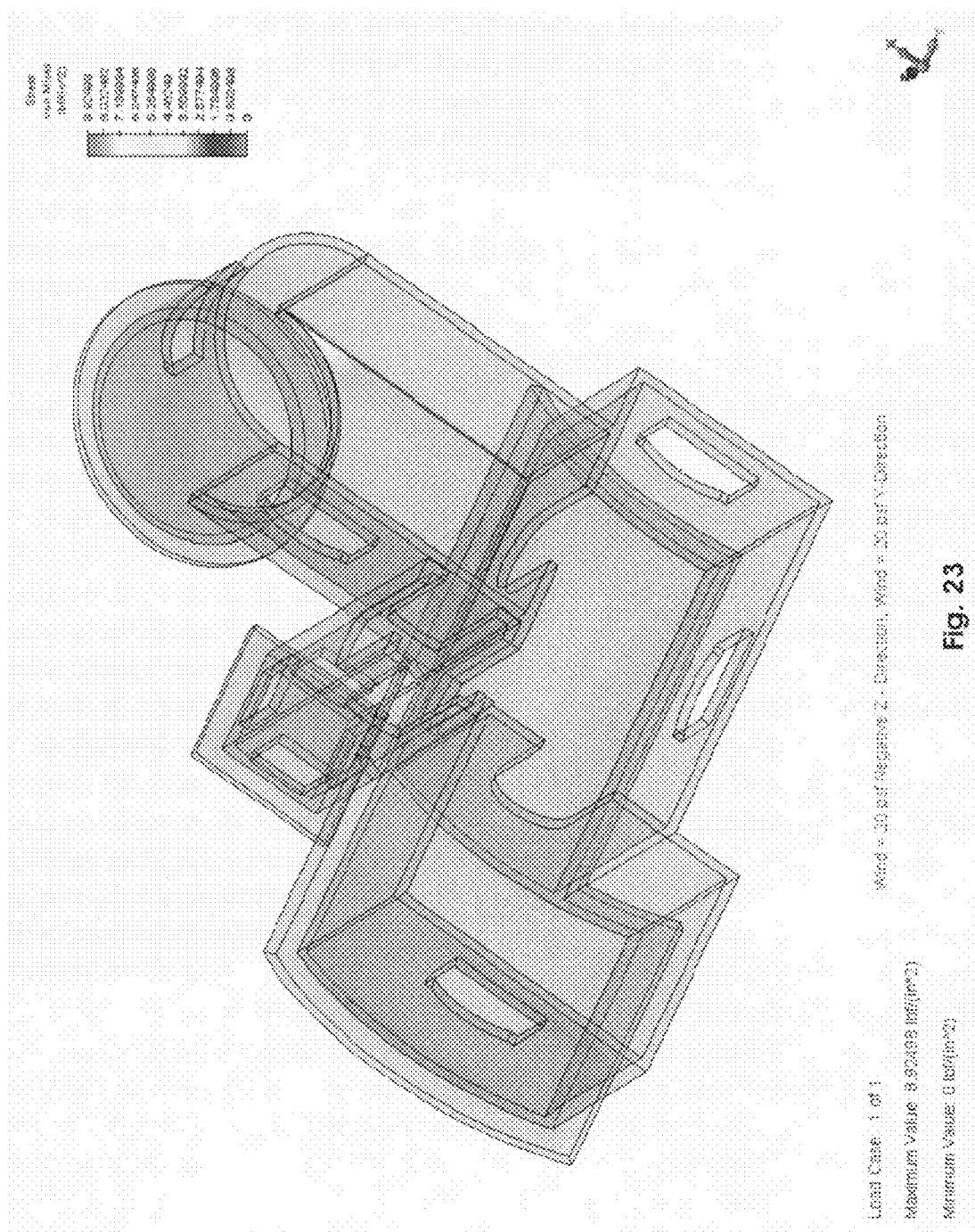
Fig. 2.3

METHOD OF PERFORMING A FINITE ELEMENT ANALYSIS OF A COMPOSITE STRUCTURE

CROSS-REFERENCE TO RELATED APPLICATIONS

This application is a continuation-in-part if Ser. No. 60/848,554, filed Sep. 30, 2006.

This application is related to U.S. Pat. No. 6,721,684, granted to the inventor, in which the core of the composite building was created by using the manual method of dividing the solid core geometry of the CAD model into discrete volumes, such as bricks and tetrahedral elements (FIGS. 67 through 87 of that patent).

BACKGROUND OF THE INVENTION

This invention discloses an improvement on U.S. Pat. No. 6,721,684 which disclosed a method of performing the Finite Element Analysis (FEA) of a composite structure using a FEA program, such as Algor FEMPRO. Now, in these programs, the solid, shell, or plate structure can be divided into discrete meshes by a powerful automeshing portion of the program. The program has three choices of meshing—Solid meshing (meshing of the Solid or core), Midplane meshing (meshing at the midplane) and Plate or Shell meshing (meshing of a surface). All of these choices require the material of the structure to be homogenous to produce a valid solution. However, a composite structure is made of at least two different materials and, therefore, is not homogenous. The thicker material or part of the composite (the matrix or the core) can be represented by discrete volumes, such as brick and tetrahedron elements, and the thinner parts (coatings or laminates) can be depicted by shell or plate elements. Composite structures are very complex to analyze. However, when the problem is broken into brick elements (discrete volumes) for the matrix core and plate or shell elements for the surface coating, the complex composite structure becomes easier to solve. This was the technique used in U.S. Pat. No. 6,721,684. Now, software, such as Algor, provides automeshing for either solid or plate and shell parts, but not in a combined form, such as a composite. Therefore, these programs could not provide a valid solution for a complex composite structure.

BRIEF DESCRIPTION OF THE INVENTION

This invention discloses a method for providing a valid solution for a composite structure using FEA programs. For composites having a core with a thin coating or laminate added to one or both major surfaces, the coating is treated as a Plate and is added to the Solid (core) of the structure. The FEA of the resulting structure under various types of loading provides a valid solution.

The method of the invention constructs the solid elements of the core of the building using automatic meshing engines offered by software manufacturer such as ANSYS, NASTRAN, ALGOR, ABACUS and ABAQUS. Optionally, after construction of the core Solid mesh, a Finite Element Analysis (FEA), structural analysis, of the core of the composite building can be carried out to test the meshing and thereby to make sure that a "water tight" Solid mesh has been produced. The FEA can be run using only one load parameter, such as gravity loading. If the FEA is run and converges toward a correct solution, then the next step is taken. If the FEA is not run, then the next step is taken after the core Solid meshing.

The next step is to construct the surface coating material of the composite building which can be accomplished in Algor FEMPRO or SUPER Draw programs. This is accomplished by copying the surface mesh lines of the core and by using the surface mesh to construct plate or shell elements on top of the solid brick and solid tetrahedral brick elements of the core. The copying is done at zero distance from the surface mesh of the core. Usually the building is divided into parts, and the surface mesh of each part is copied separately. After copying the mesh of the inner and outer surfaces of each part, each mesh copy (Plate element) is numbered, and the mechanical and dimensional properties of the coating are entered. Then, the FEA or analysis/problem may be solved for the composite building.

BRIEF DESCRIPTION OF THE DRAWINGS

FIGS. 1-23 are perspective views of the invention.

DETAILED DESCRIPTION OF THE INVENTION

Figure 1:
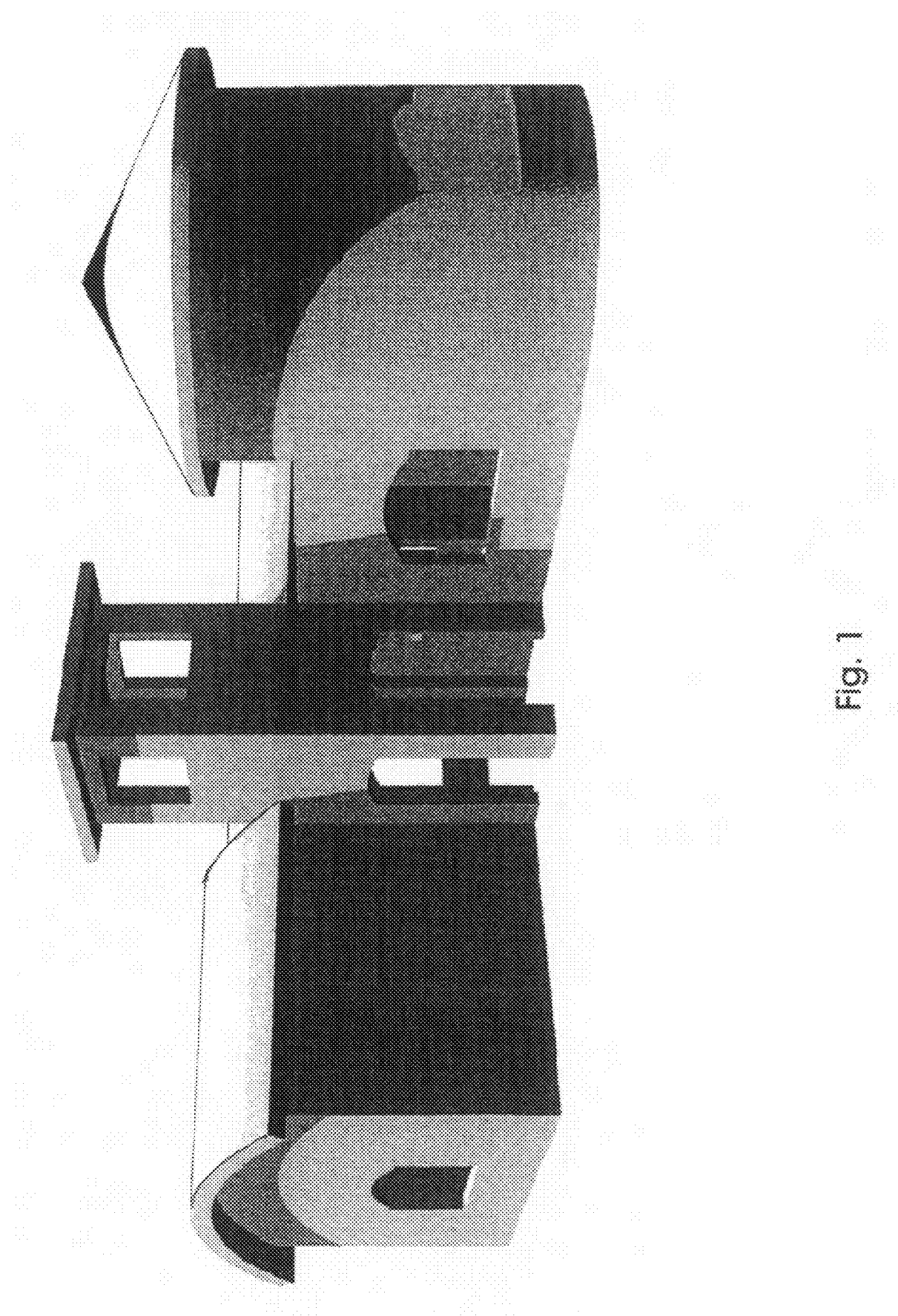

FIG. 1 shows the rendering of a structure or building created in 3D solid format using an AutoCAD software. The CAD program can also be a program/software, such as AutoCAD, Solidworks, Alibre, Mechanical Desktop, etc.

Figure 2:
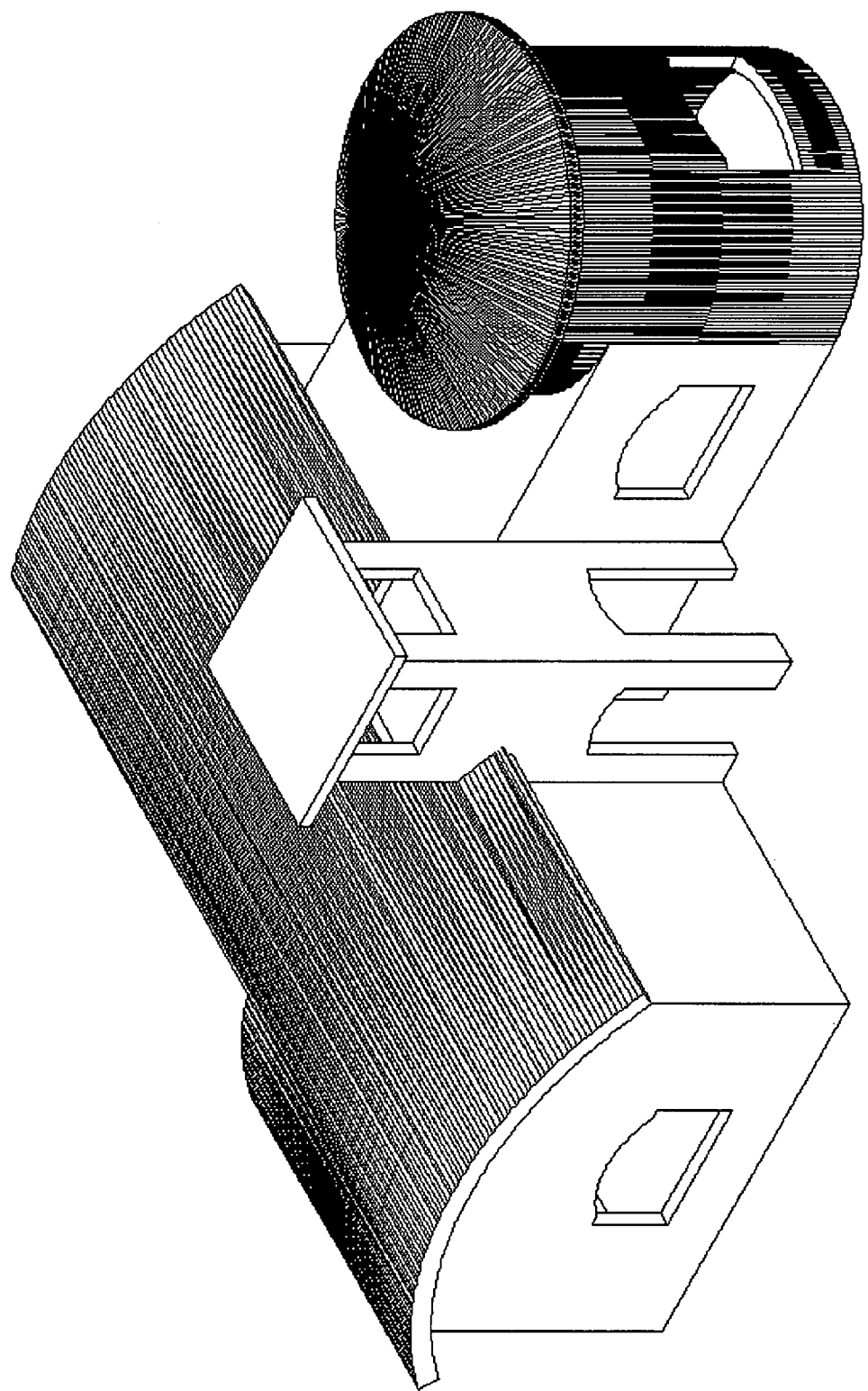

FIG. 2 shows the solid format of a 3D drawing constructed by Mechanical Desktop by Autodesk. When the building is created, the dimensions of the building are provided to the program by the building designer/architect.

Figure 3:
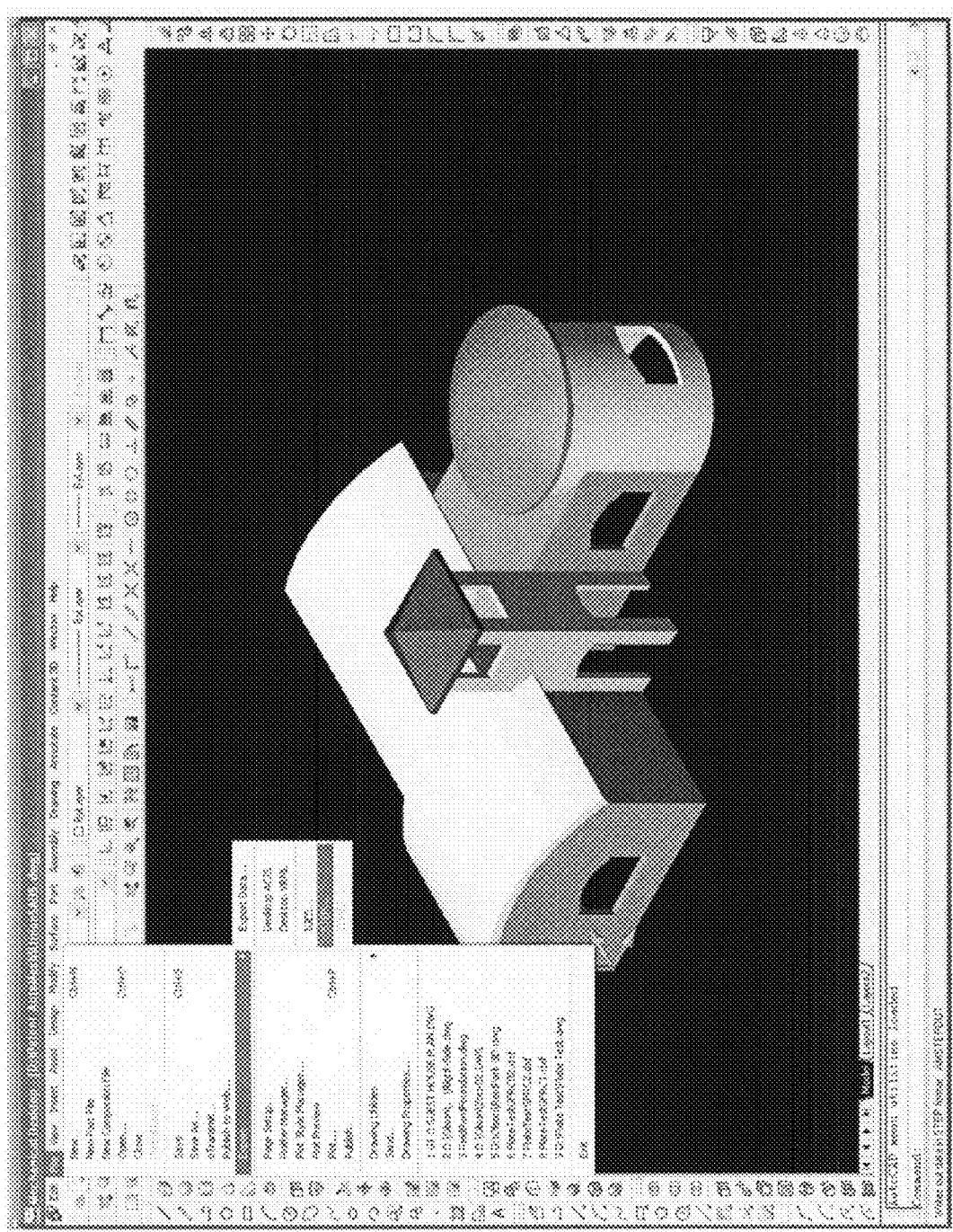
Figure 4:
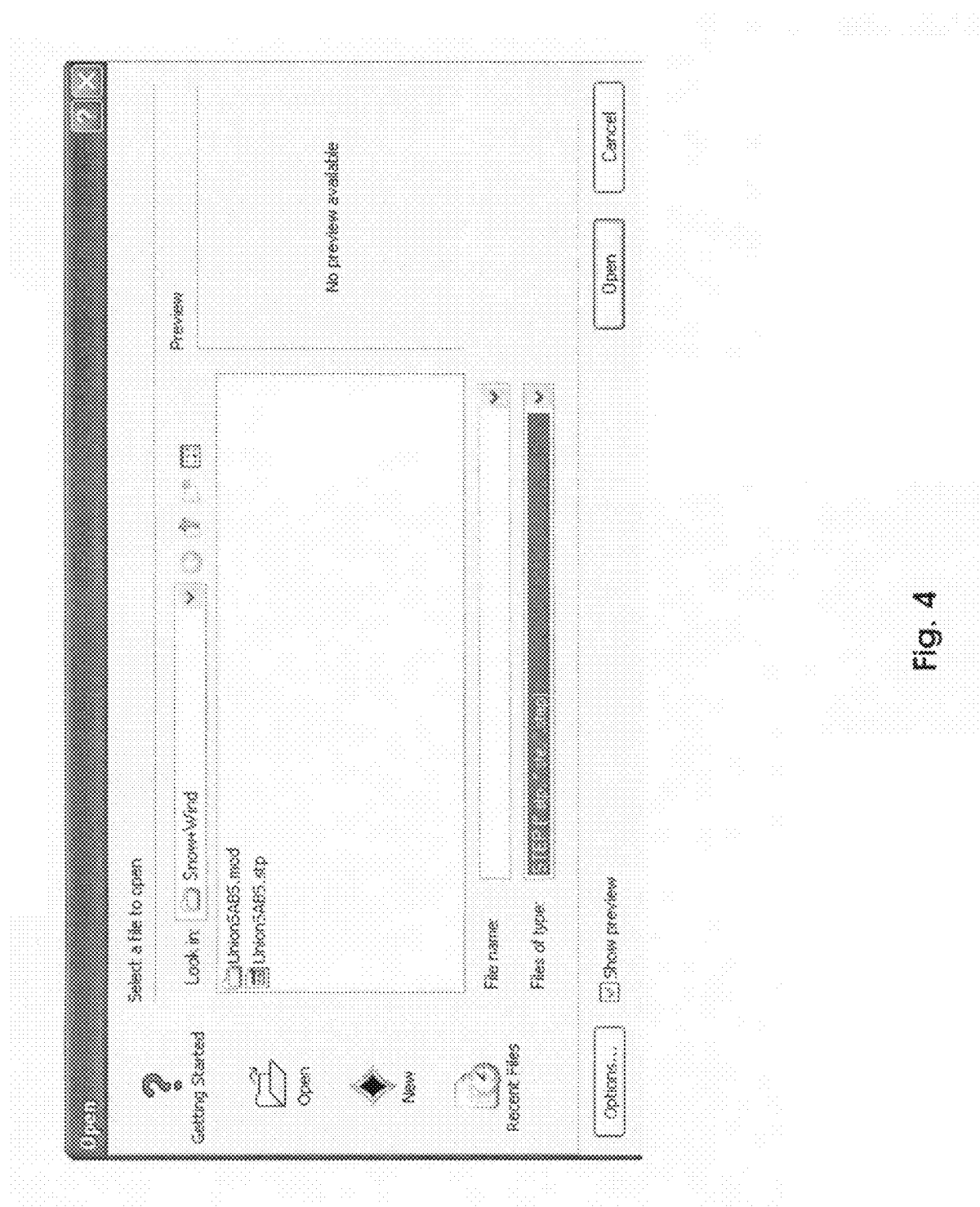

FIG. 3 shows the exporting of the 3D CAD drawing file using a compatible format that can be exported out of the CAD program and imported by a Finite Element Analysis (FEA) program or software, such as Algor (FIG. 4). Depending on the FEA program, a different output or export format defining the solid model is selected. These formats maybe of the file type that have the extension STEP, IGES and SAT. If the building is to be worked on in pieces, STEP can be used. If the building is to be worked on in one piece or united, IGES can be used. In this example, the name of the CAD file being exported in STEP format is named "UnionSABS.dwg" which after the conversion is named "UnionSABS.stp". This figure shows the exporting of the CAD file into a stp file.

FIG. 4 shows the Algor (FEMPRO) program display which allows the opening of the file UnionSABS.stp. The file is selected and opened.

Figure 5:
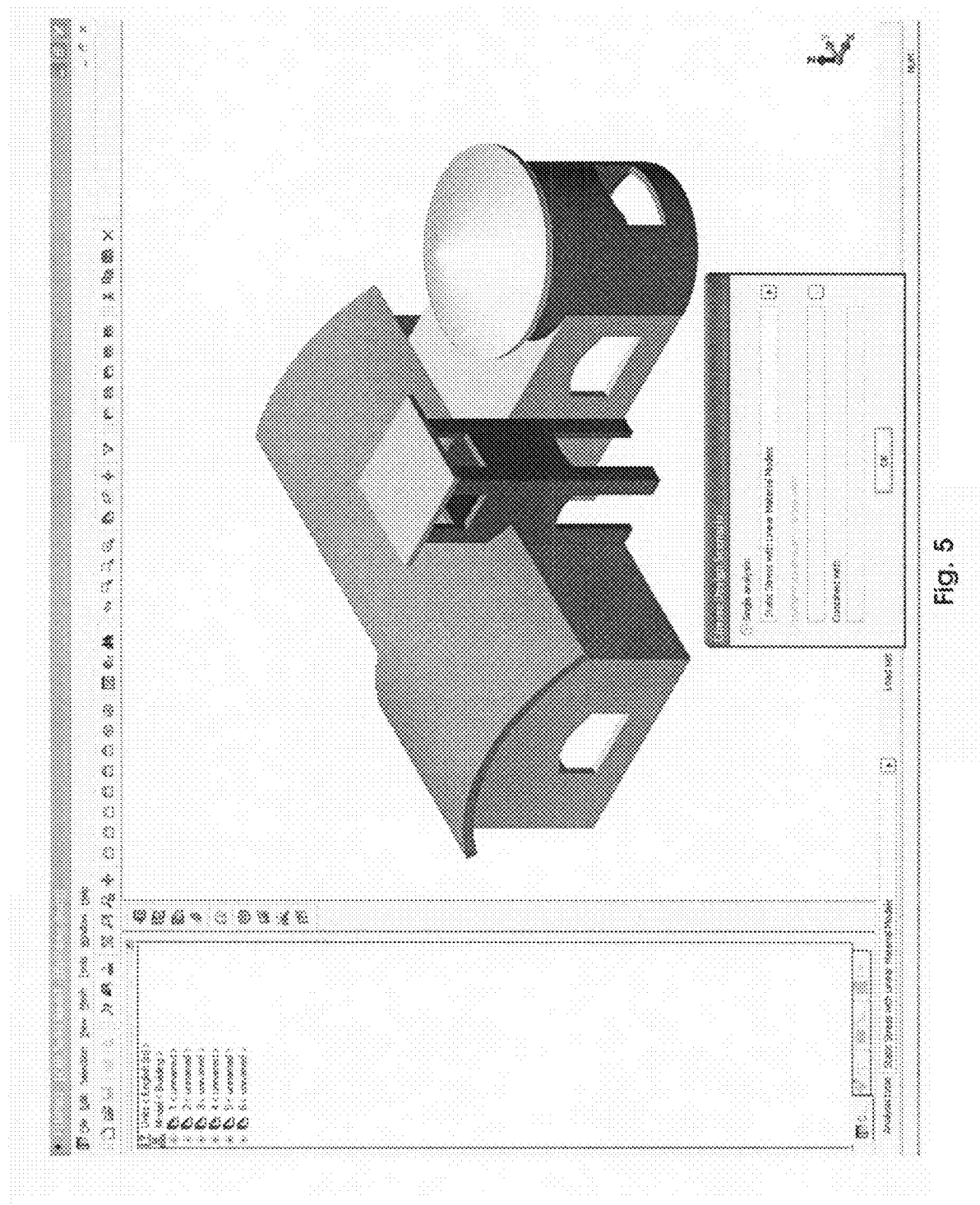

FIG. 5 shows the importation of the solid CAD file into Algor. The building has been divided into 6 parts. The division was made during the construction of the building in the CAD program. The parts are unnamed, but they could be named for easy identification.

Figure 6:
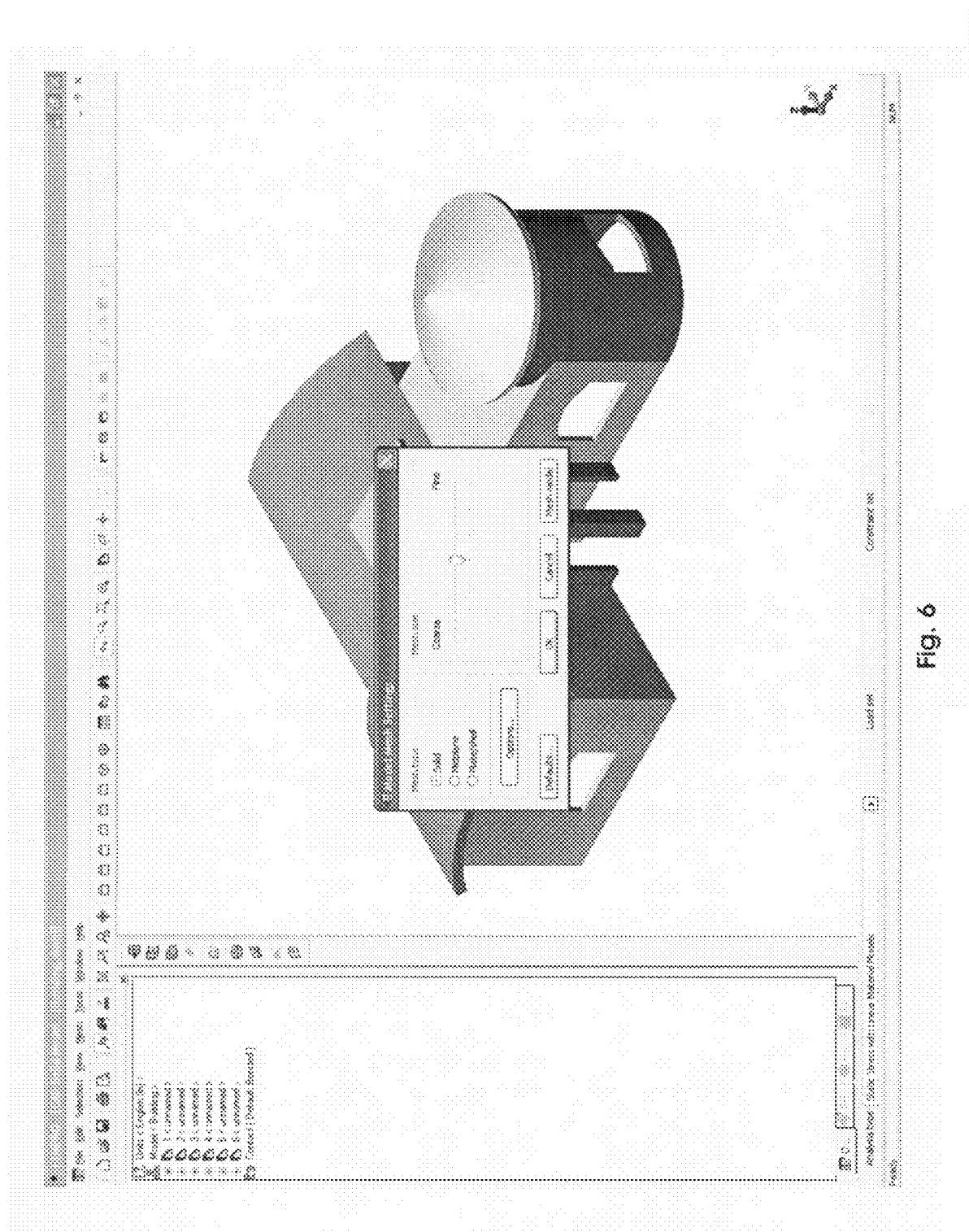

FIG. 6 shows Algor program display which allows the user to choose the type of mesh and the dimension, size or the degree refinement of the mesh which can be defined as a percentage of the total object or in inches or millimeters. Solid Mesh has been chosen. Note that even though Mesh type-Solid is chosen, only the surfaces of the solid will be meshed. The inner and outer surfaces of the building are meshed. Next, the Options button is clicked.

Figure 7:
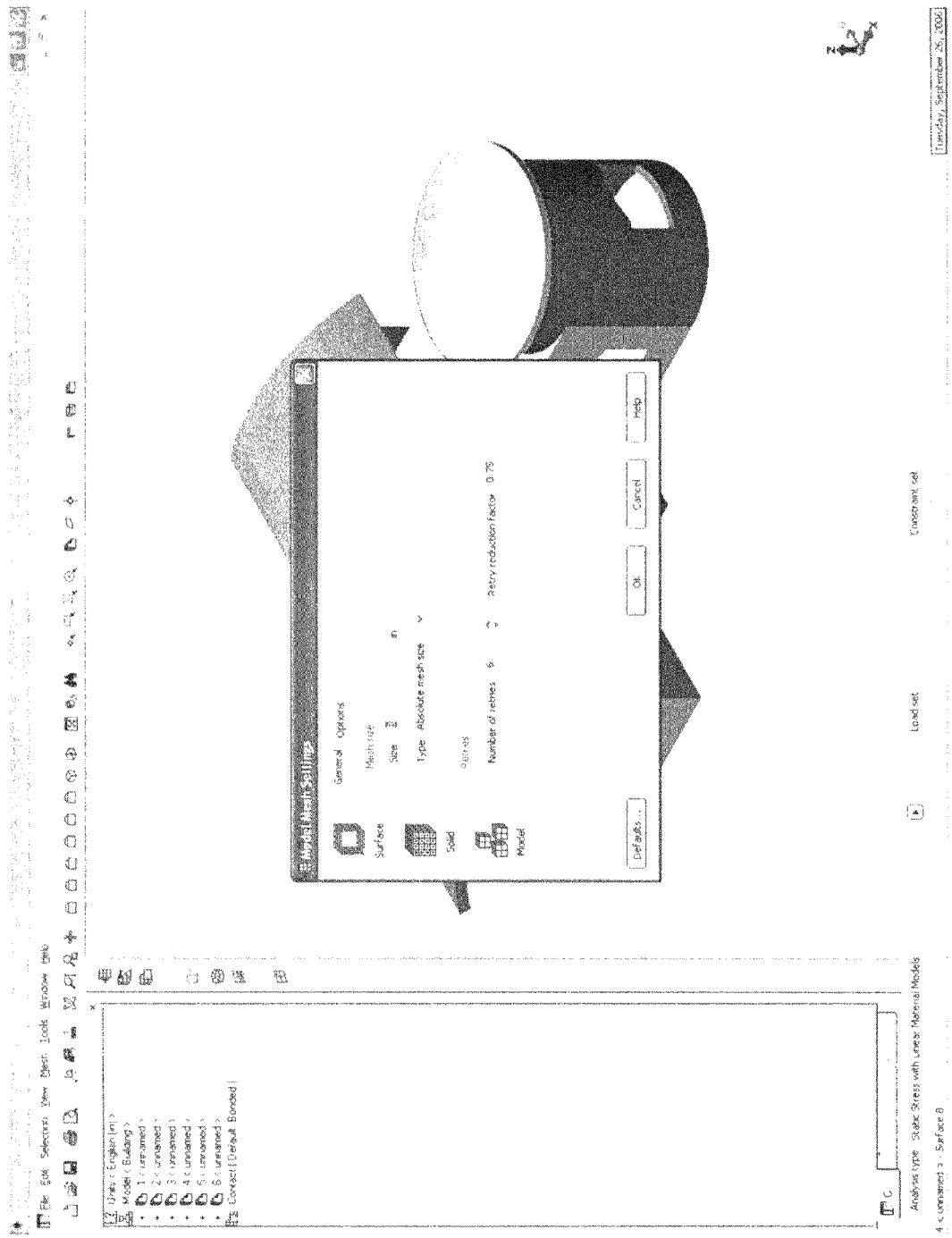

FIG. 7 shows the display of the Options in the display of FIG. 6. In this example, the nominal size of the mesh is chosen as 8 inches as an Absolute mesh size. The program by default will retry fitting the mesh into the smaller areas for 6 retries (6 times). This prevents the program from getting hung up in trying to mesh an area. The Retry reduction factor is 0.75 inches.

Figure 8:
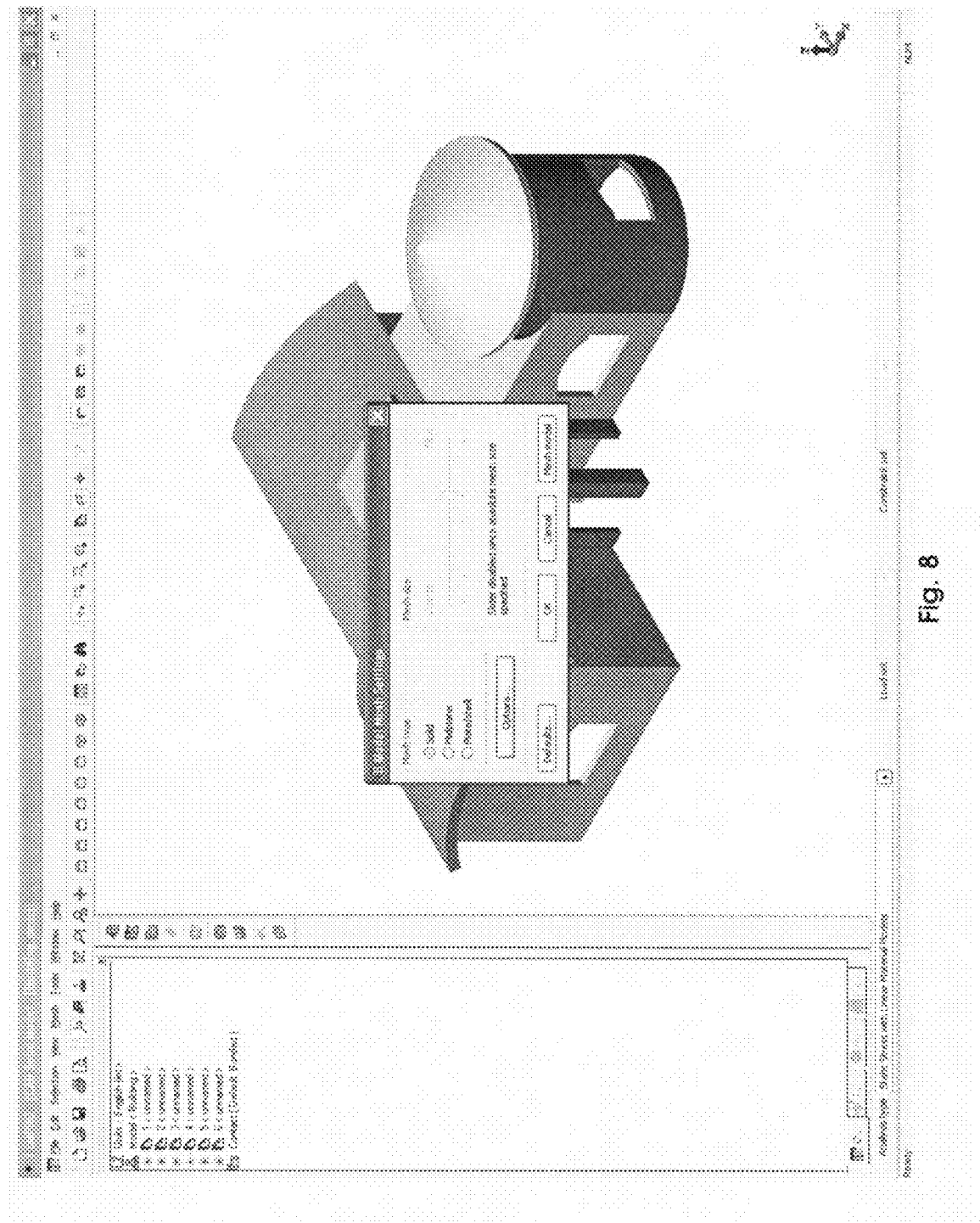

FIG. 8 shows the display before the meshing is initiated by clicking the Mesh model button.

Figure 9:
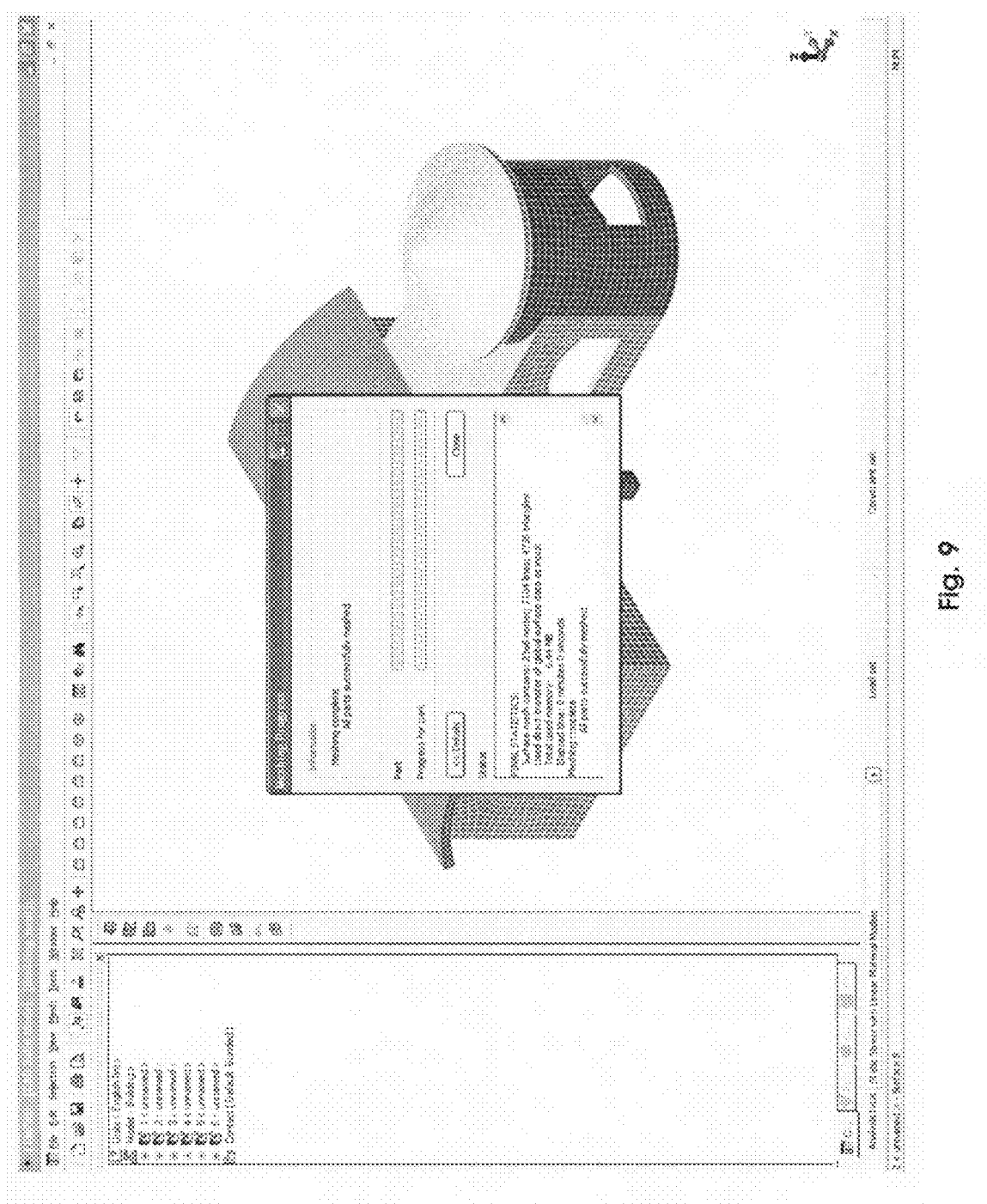

FIG. 9 shows the end display of a successful automatic surface meshing of all of the parts. All of the surfaces of the building are meshed.

Figure 10:
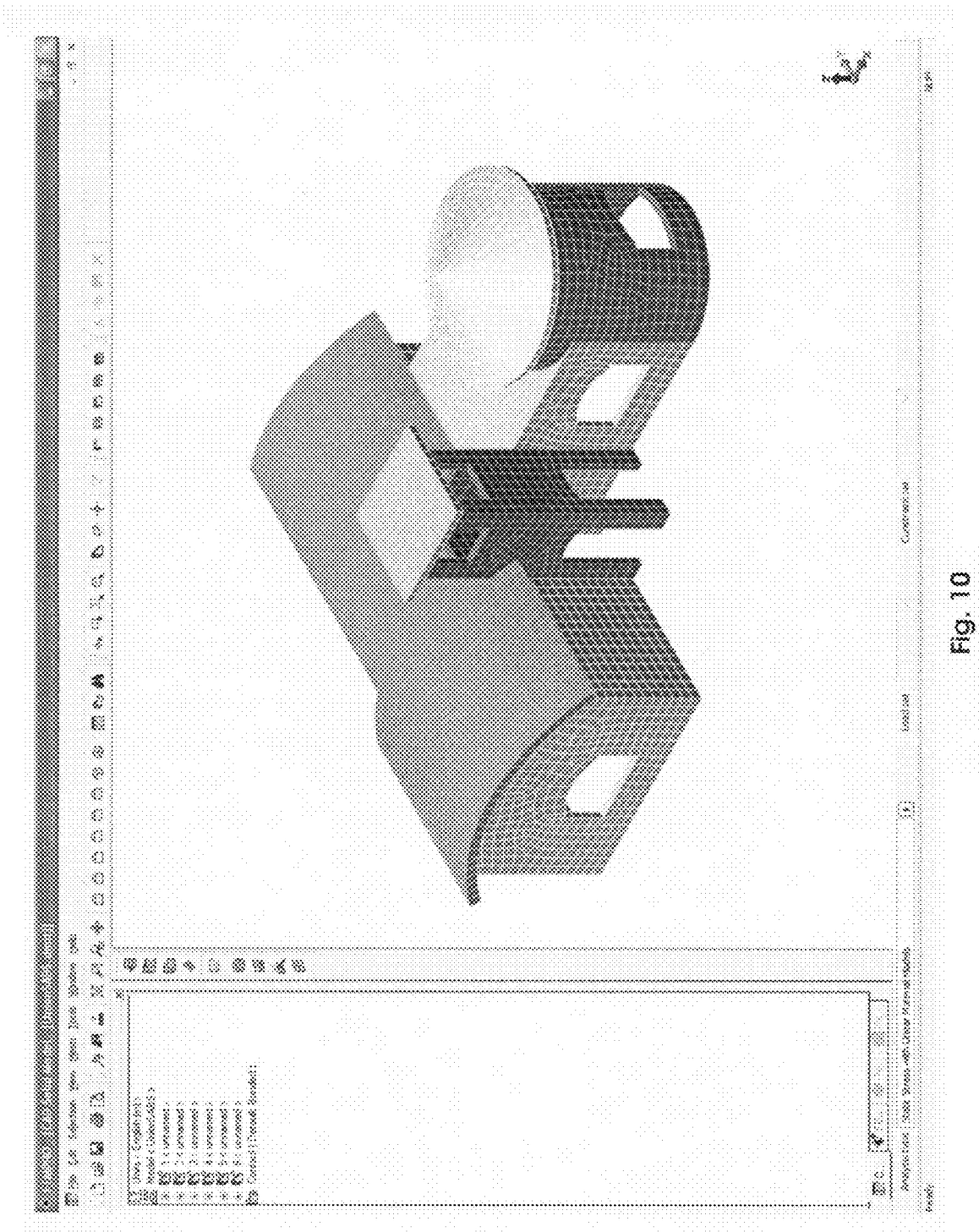

FIG. 10 shows the building with the surface mesh process completed in the Algor FEMPRO program. The building is separated into 6 parts.

Figure 11:
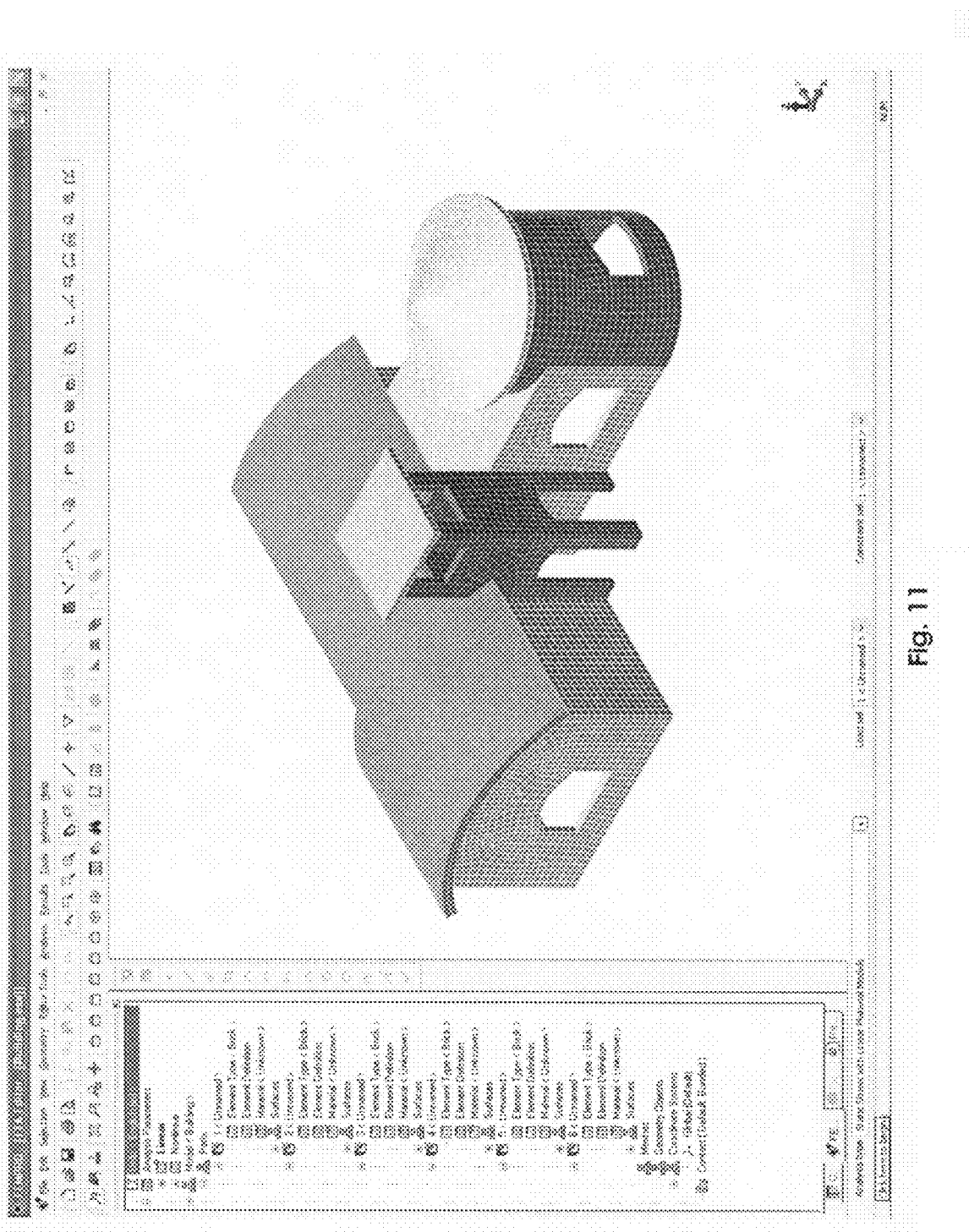

FIG. 11 shows the next step which is to access the FE Editor by clicking on the FE button in the lower left corner of the display. The FE Editor provides a way to enter the material properties of the parts.

Figure 12:
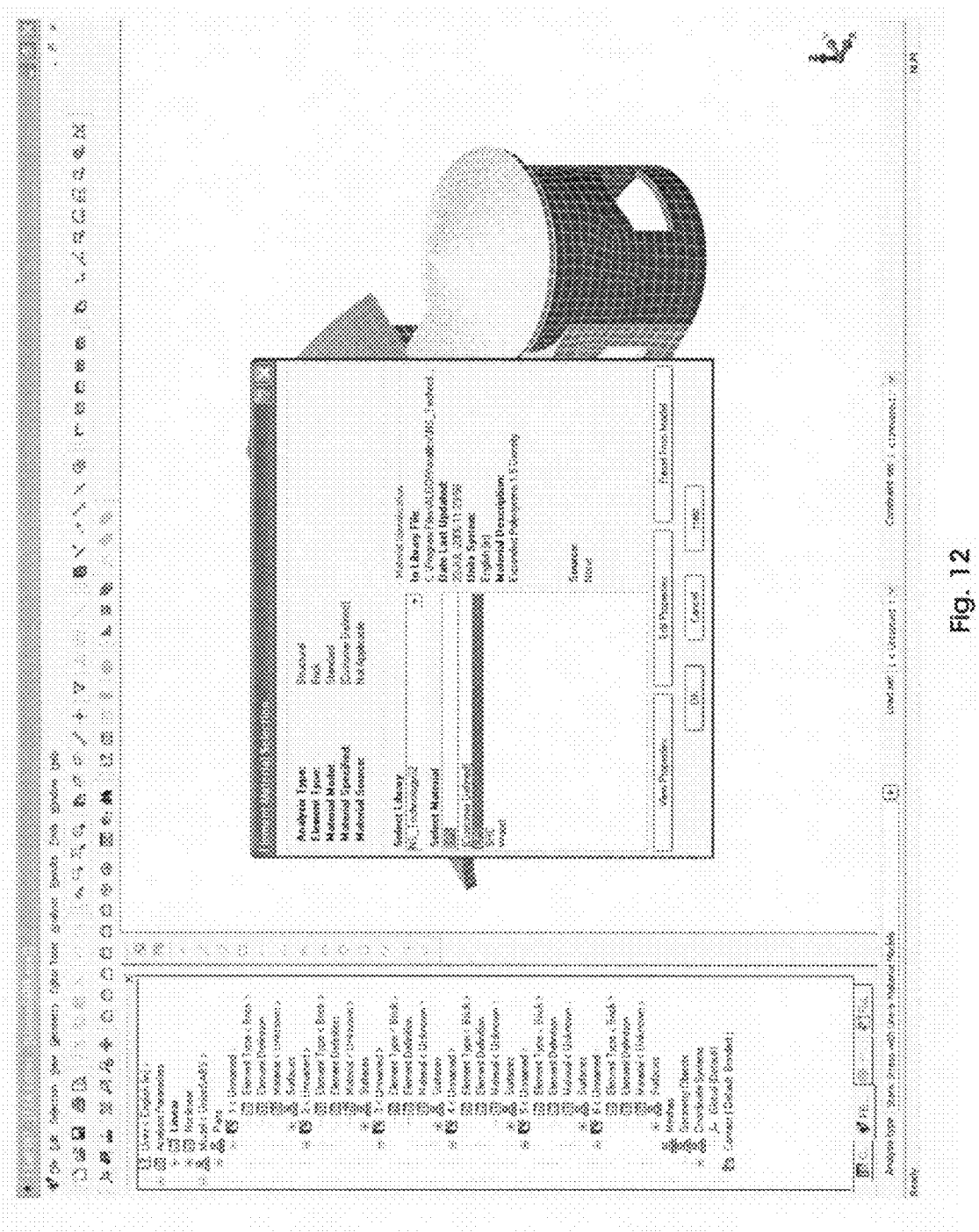

FIG. 12 shows the display for the FE Editor. This display allows information to be added about the parts. The properties of the material and thickness can be added here. Here the information about the core is being provided. The core is EPS (Expanded PolyStyrene). The information about the EPS is obtained from the designer's Library which has been imported into the Algor FEMPRO program. The information about the core and the coating is placed into the Library by the user.

Figure 13:
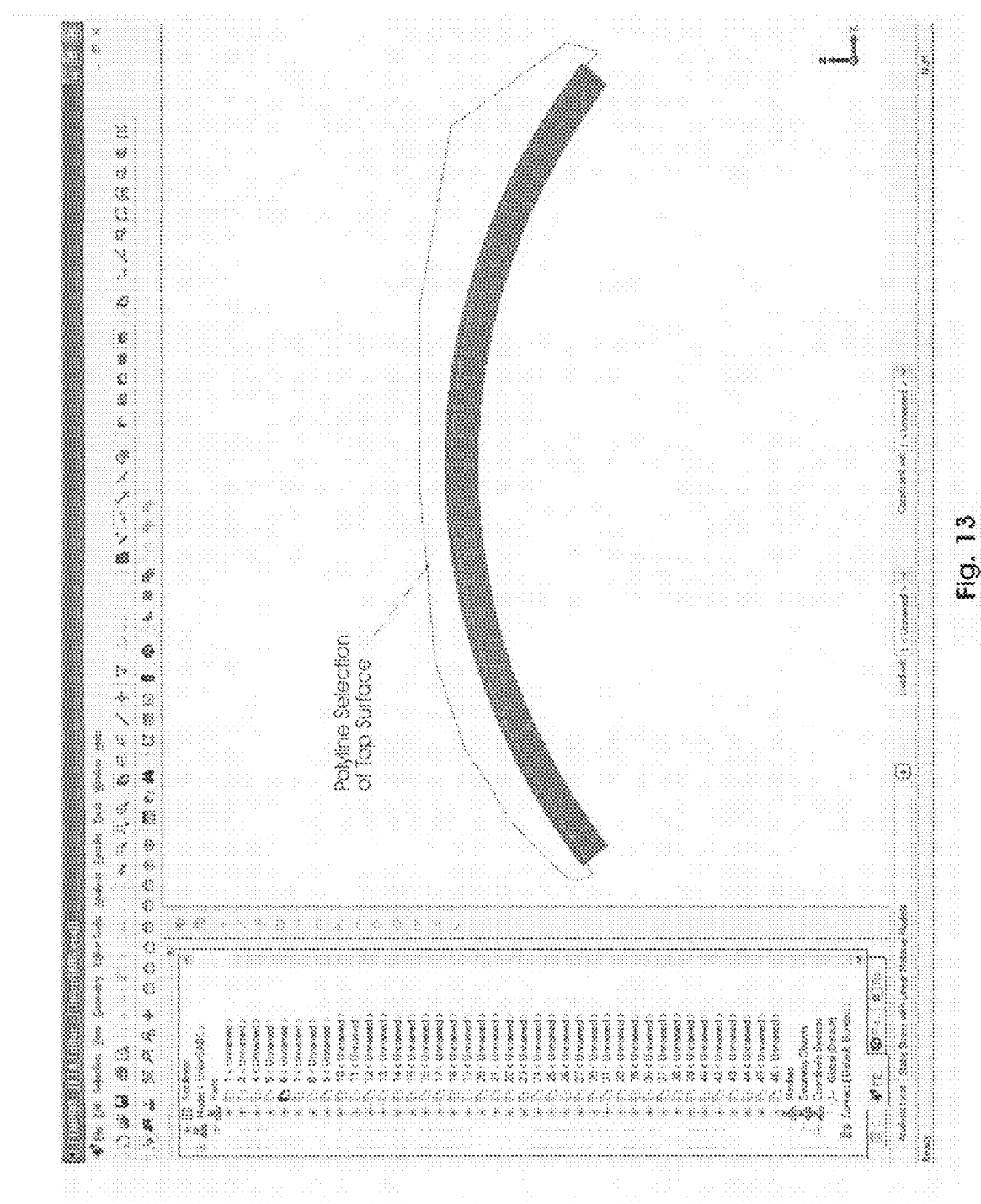

FIG. 13 shows the use of tool icon 102 (Polyline) to select the top surface of the curved roof, part 6 in this example. Note that the round roof part 6 is isolated by the process discussed in FIG. 14 before the top surface is selected.

Figure 13A:
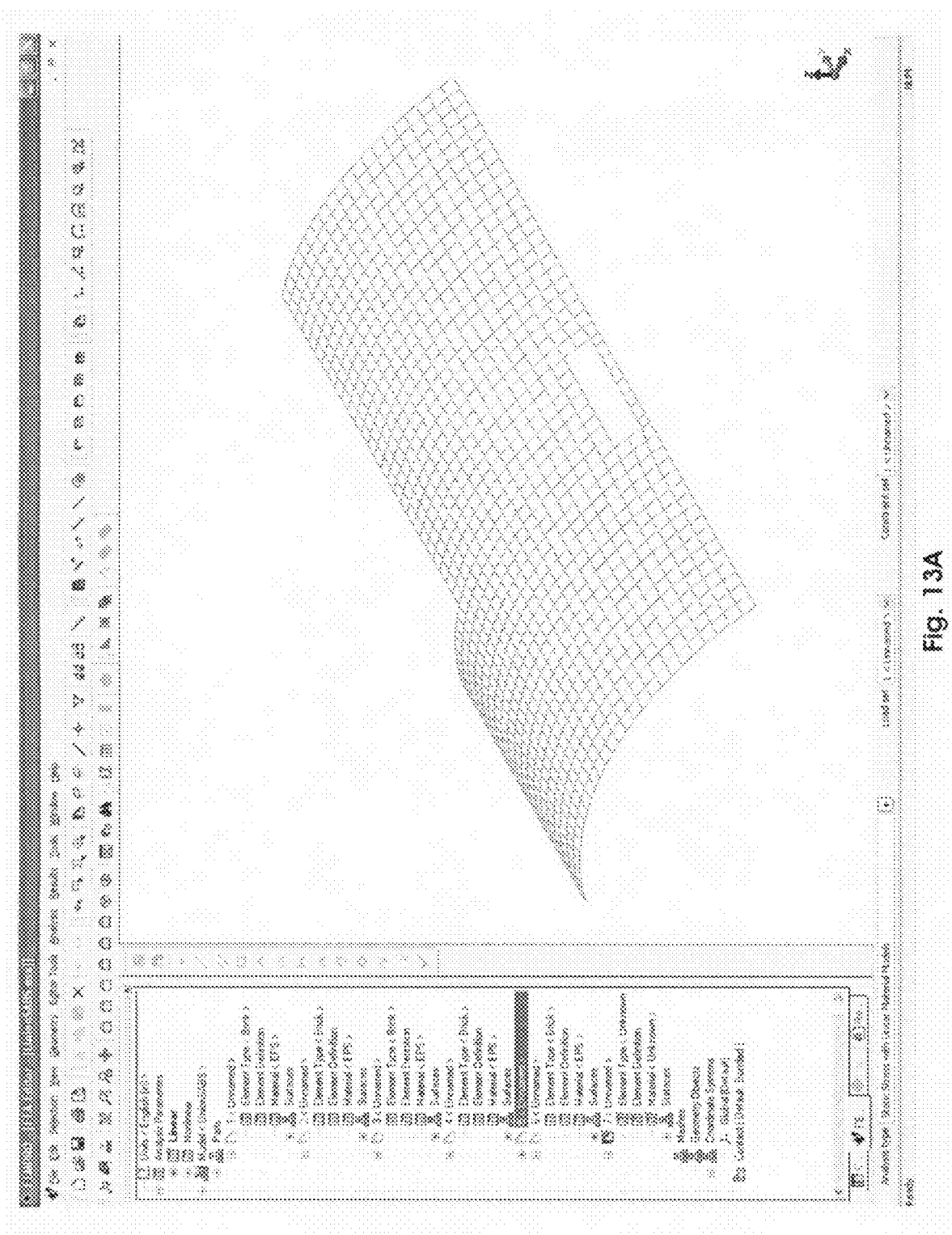

FIG. 13A shows the copied mesh (lines) of the top surface of part 6 (the round roof). The mesh is copied to construct the surface coating of the round roof part which is on top of the core of the round roof. The distance between the roof lines and the copied roof lines is set to zero.

Figure 13B:
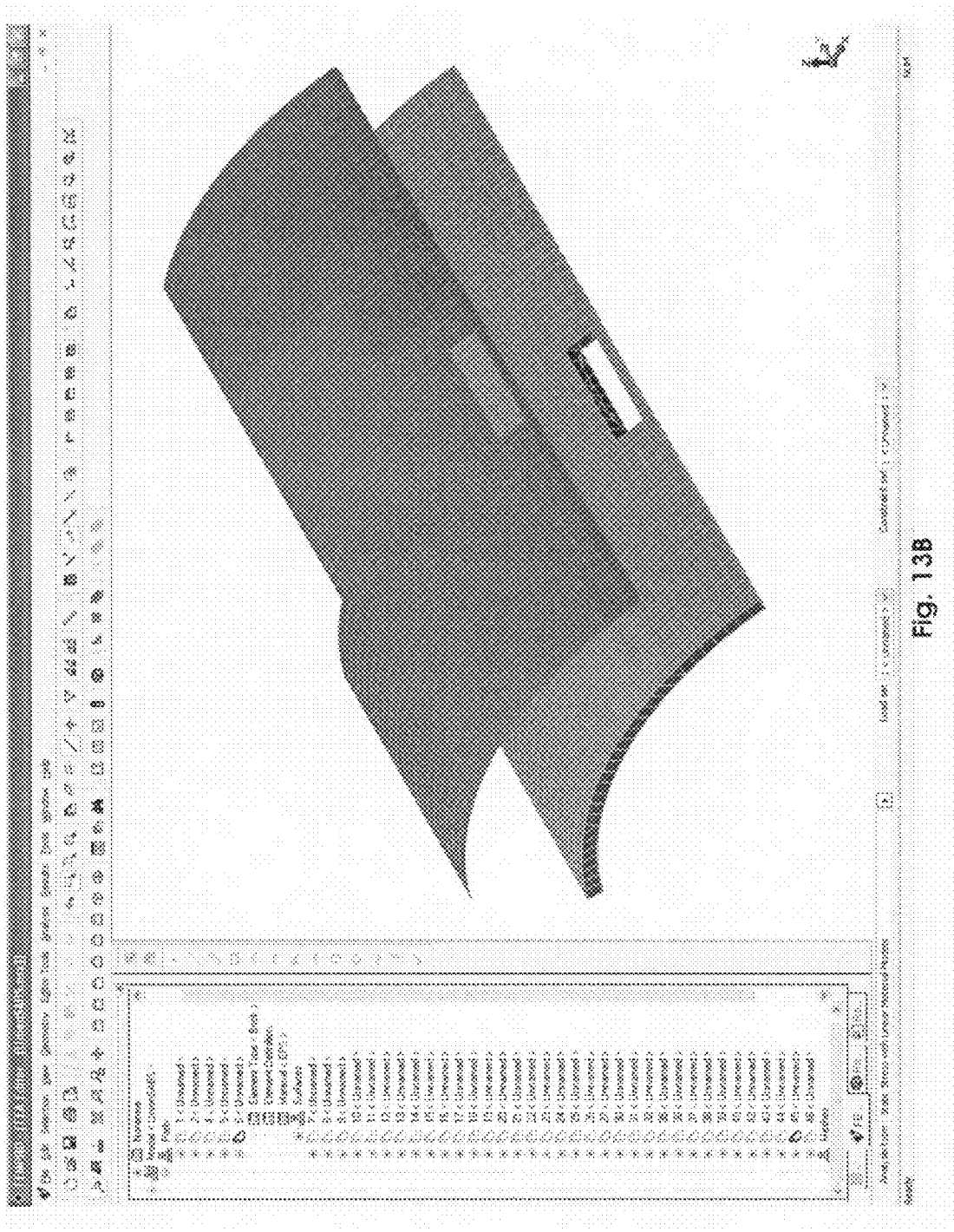

FIG. 13B shows the copied mesh (lines) of the round roof moved upwardly to show the copied mesh. The mesh has been designated with Element type—Plate. This makes it look like a plate as shown, instead of look like a mesh as in FIG. 13A.

Figure 14:
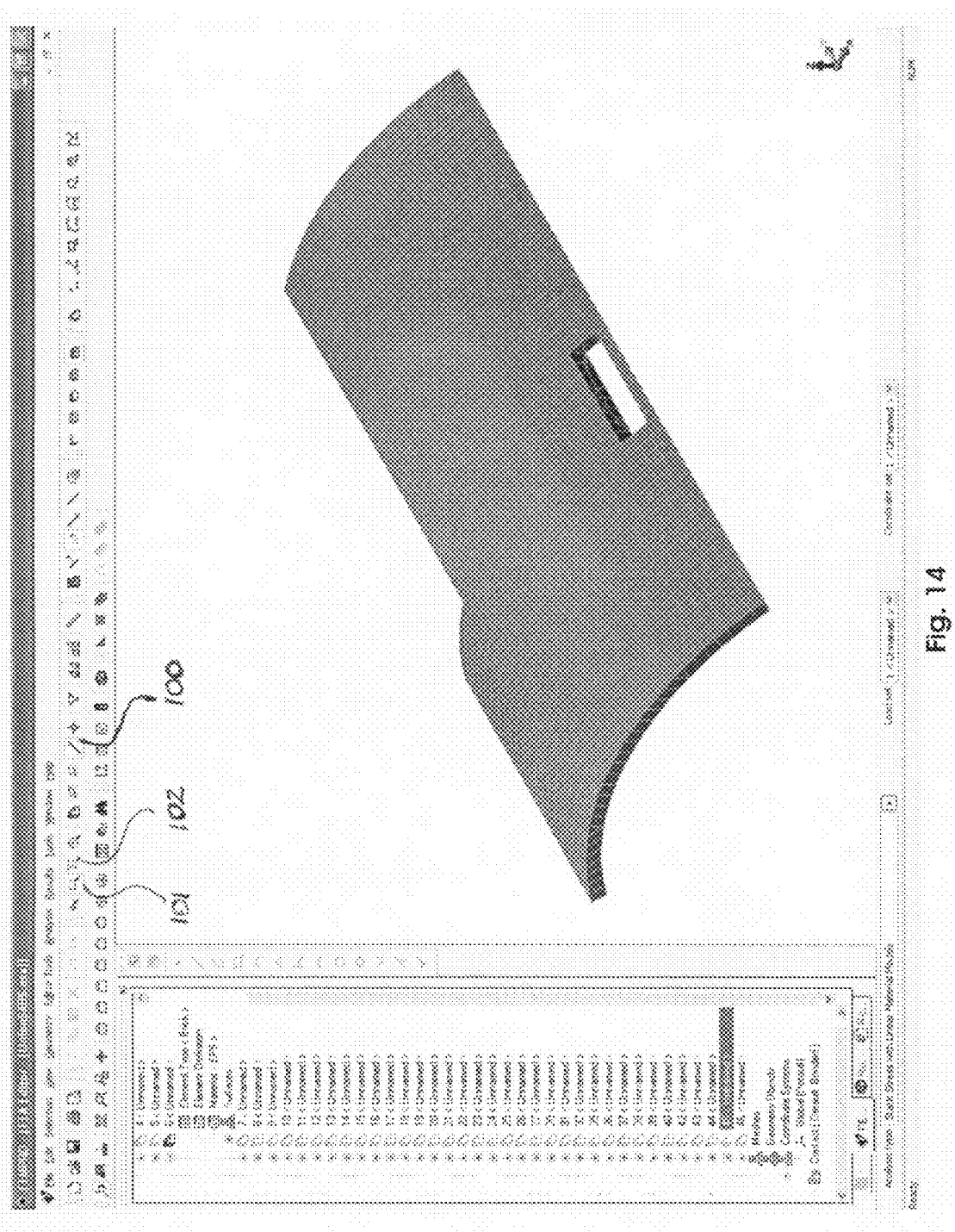

FIG. 14 shows the roof part (part 6) selected alone. The isolation of this part is done before selecting the surface and copying the surface lines (mesh). This is accomplished by Hiding the other parts of the building. Hiding is accomplished by highlighting one of the other parts (other than the roof), by touching the part and left clicking, and then right clicking and selecting Hide from the Menu. This is repeated till all but the roof is hidden. Then, the top surface mesh (lines) is selected by using the tools indicated by the icons. The tool icons are found in the toolbar on top of the FE Editor display. First the icon 100 is clicked to select Lines. Then, the tool of icon 101 or 102 is used to select the surface that is to be copied. Once selected, the top surface mesh is copied and then given a part number, part 7, in this example. This creates the part in FIG. 13A.

Figure 15A:
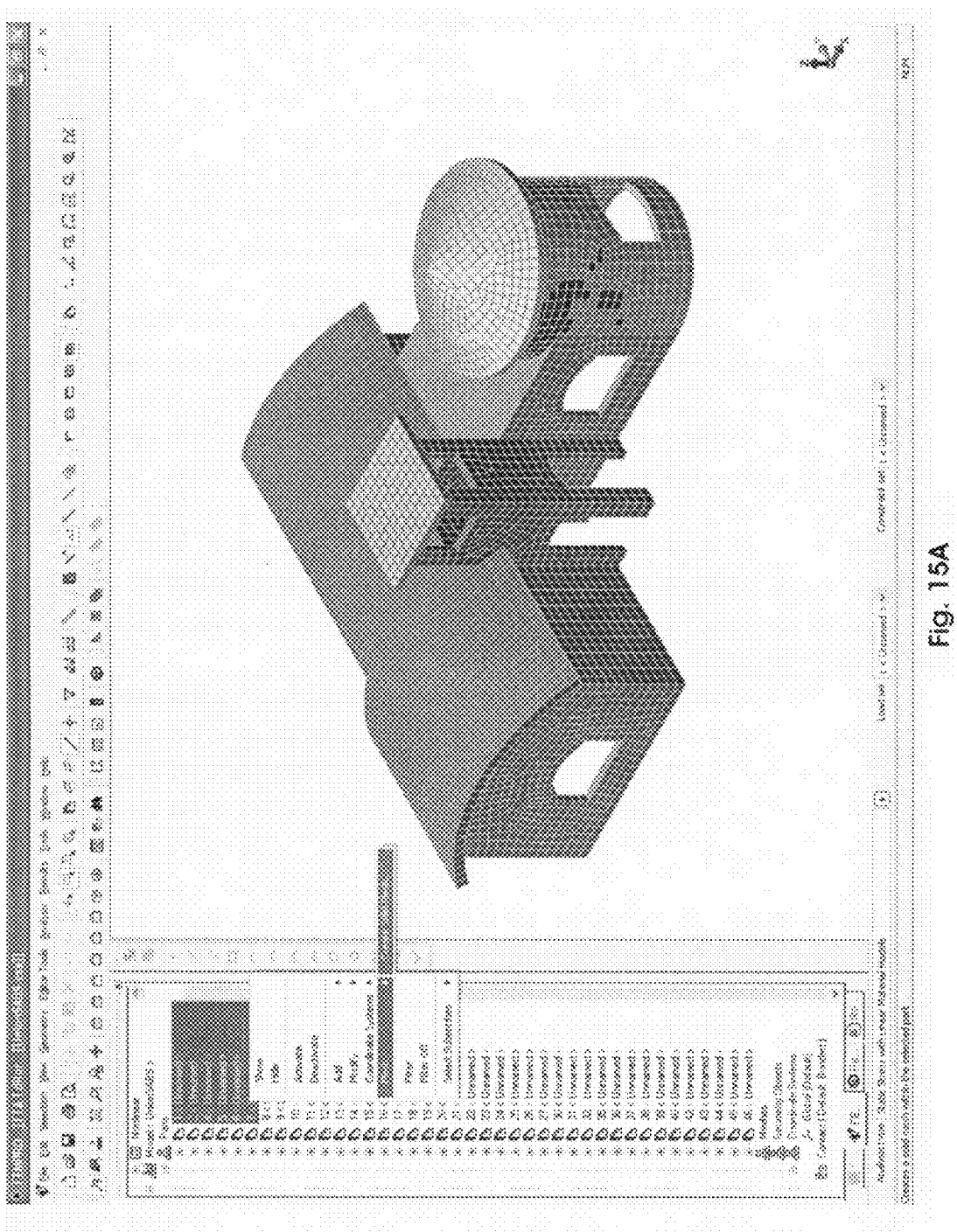

FIG. 15A shows in the portion of the display on the left that parts 7-46 have been added to the original parts 1-6. Parts 7-46 are copied surface mesh of parts 1-6. Parts 7-46 have been previously designated as Element type—Plate. Parts 1-7 have been selected here, and then a right click brings down the Menu. Mesh is selected from the Menu, and then Create Solid Mesh is selected.

Figure 15B:
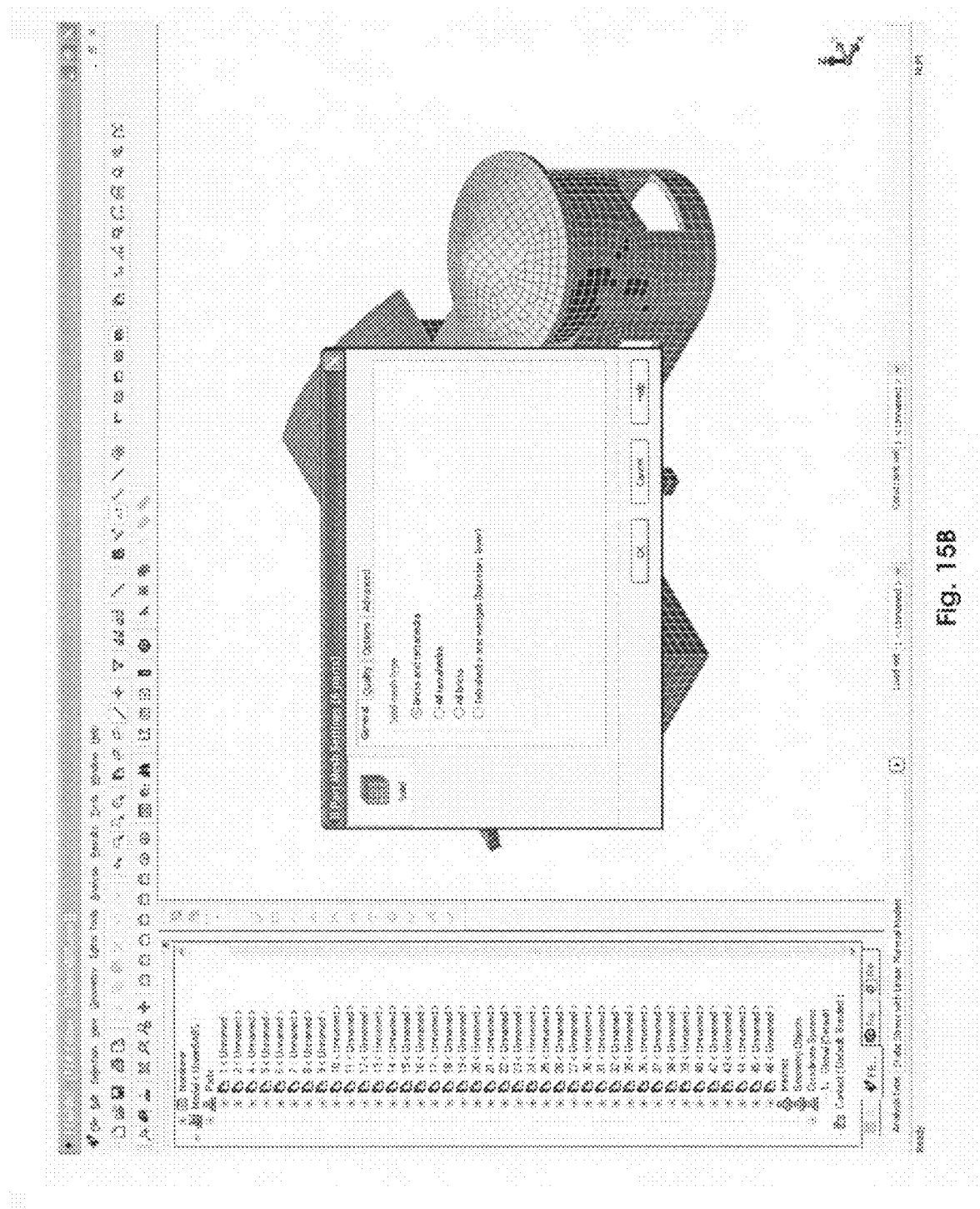

FIG. 15B shows the next display in which Bricks and tetrahedra option is selected. Then, the program connects up the nodes of the surface mesh of the parts to finish the Solid meshing of the parts. Even though part 7 was selected, it will not be Solid meshed because it is a Plate and because the FEA program knows what the parts are. It was selected by mistake for Solid meshing.

Figure 15C:
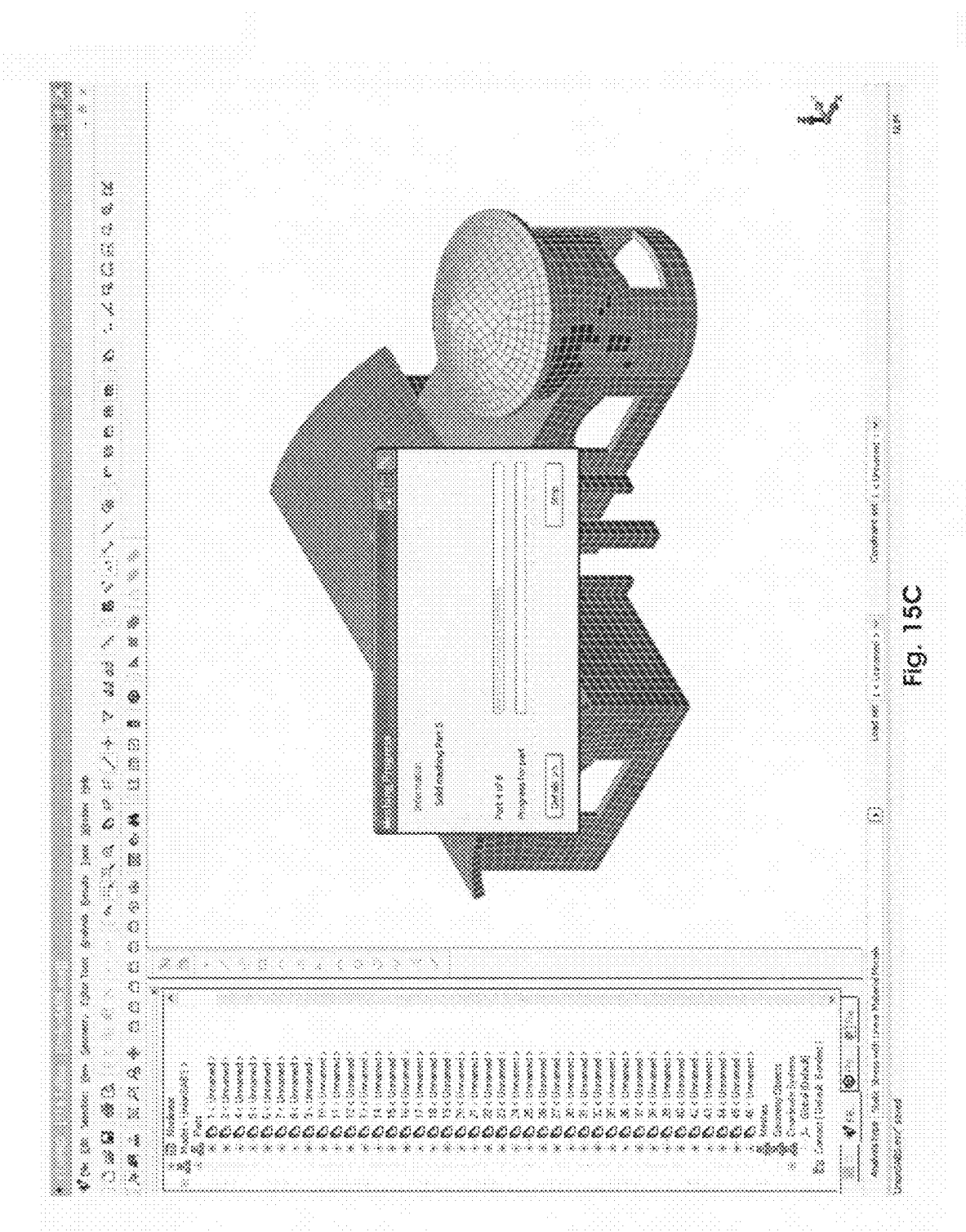

FIG. 15C shows the meshing in progress.

Figure 15D:
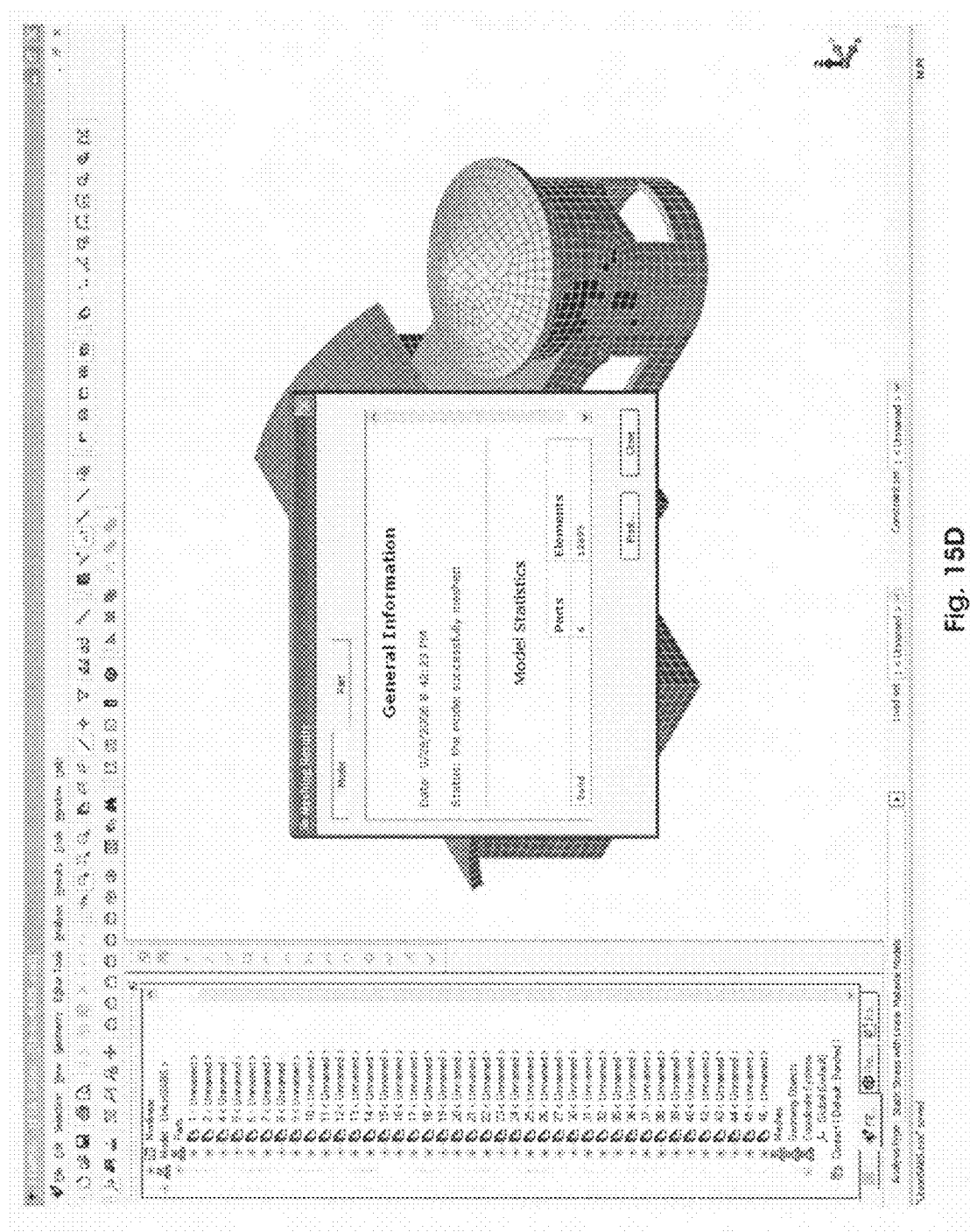

FIG. 15D shows the end result of the Solid meshing.

Figure 15E:
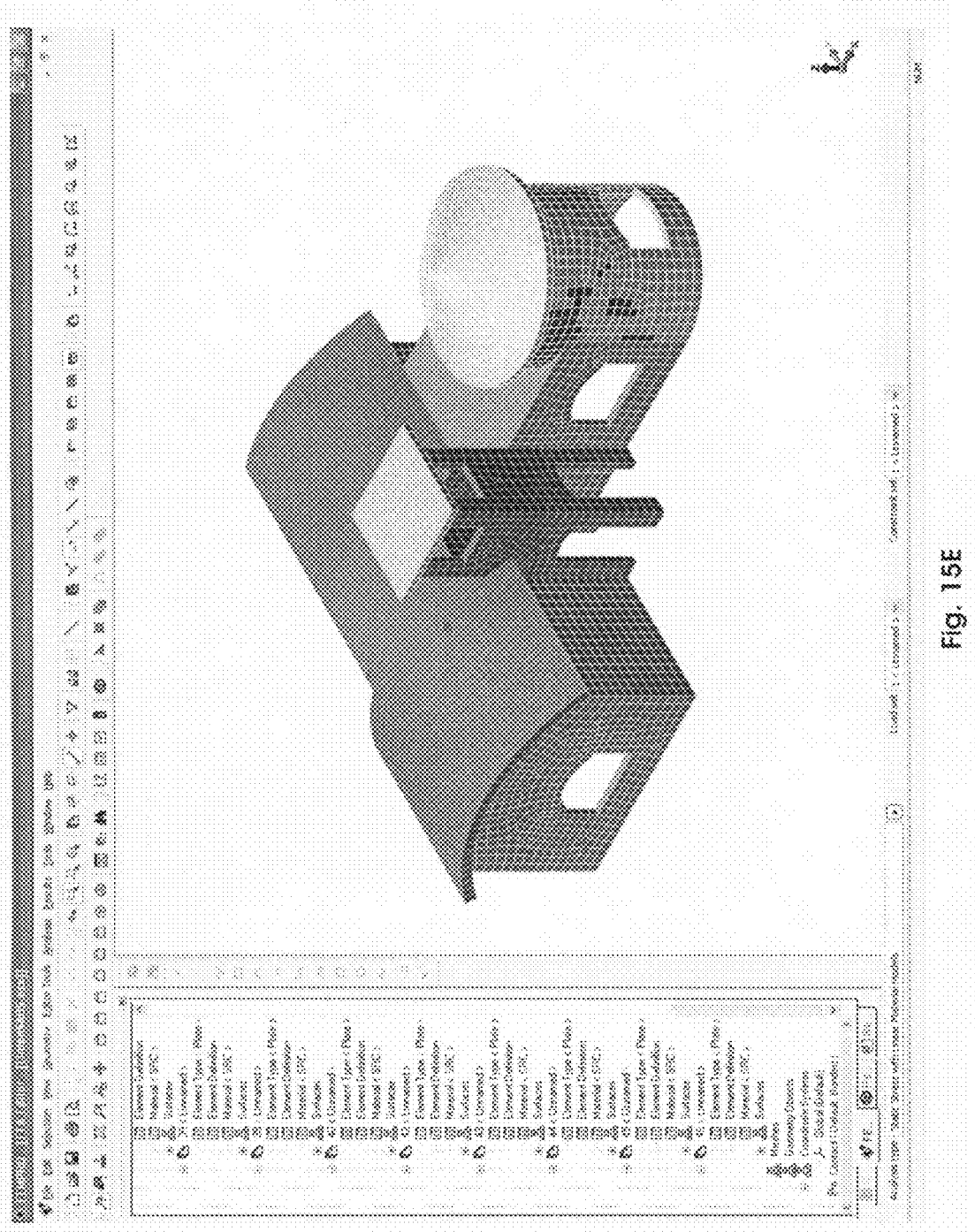

FIG. 15E shows the completed structure with meshed plates 7-46 added to all surfaces.

Figure 15F:
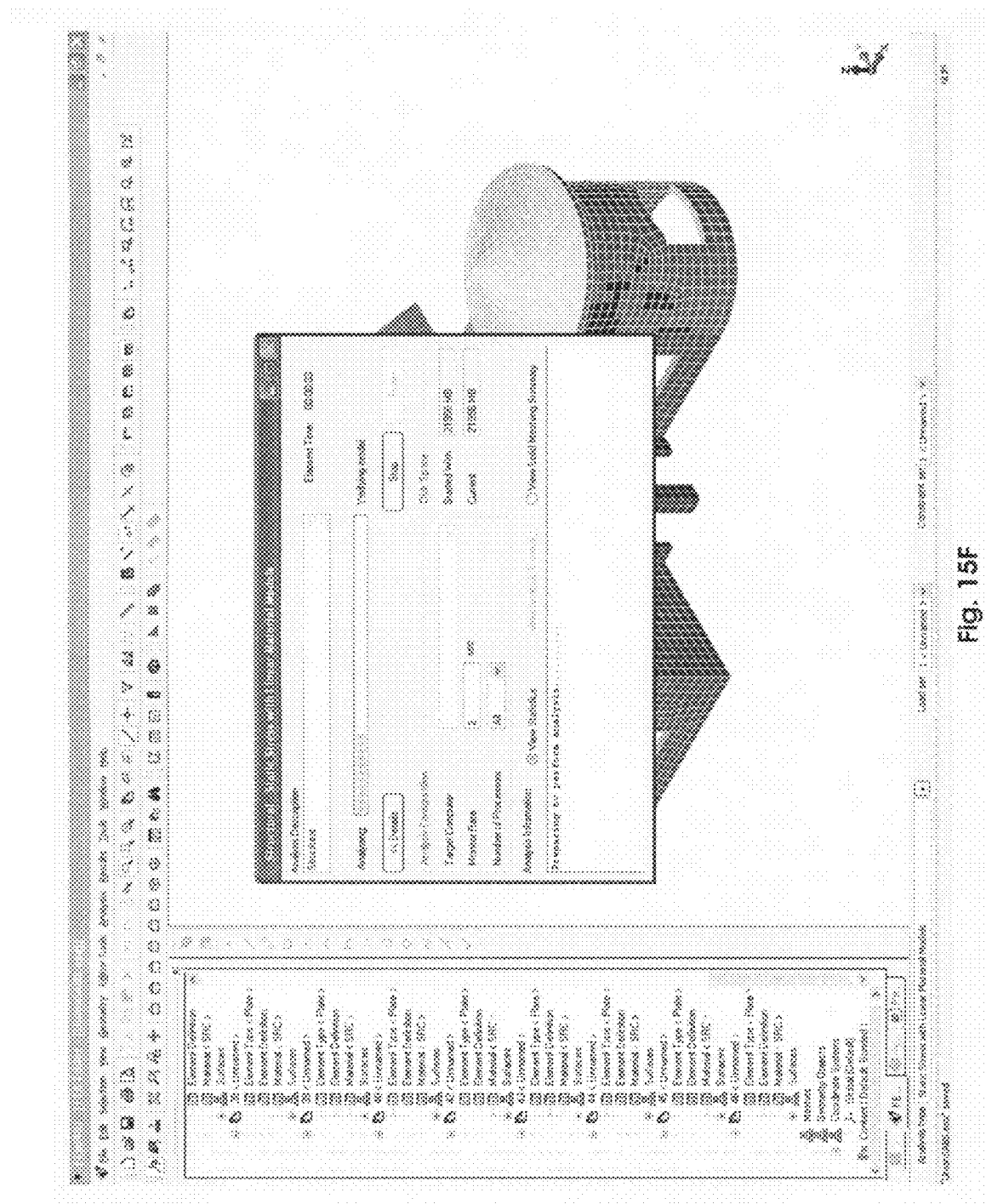

FIG. 15F shows a FEA in progress which will be a gravity only loading.

Figure 16:
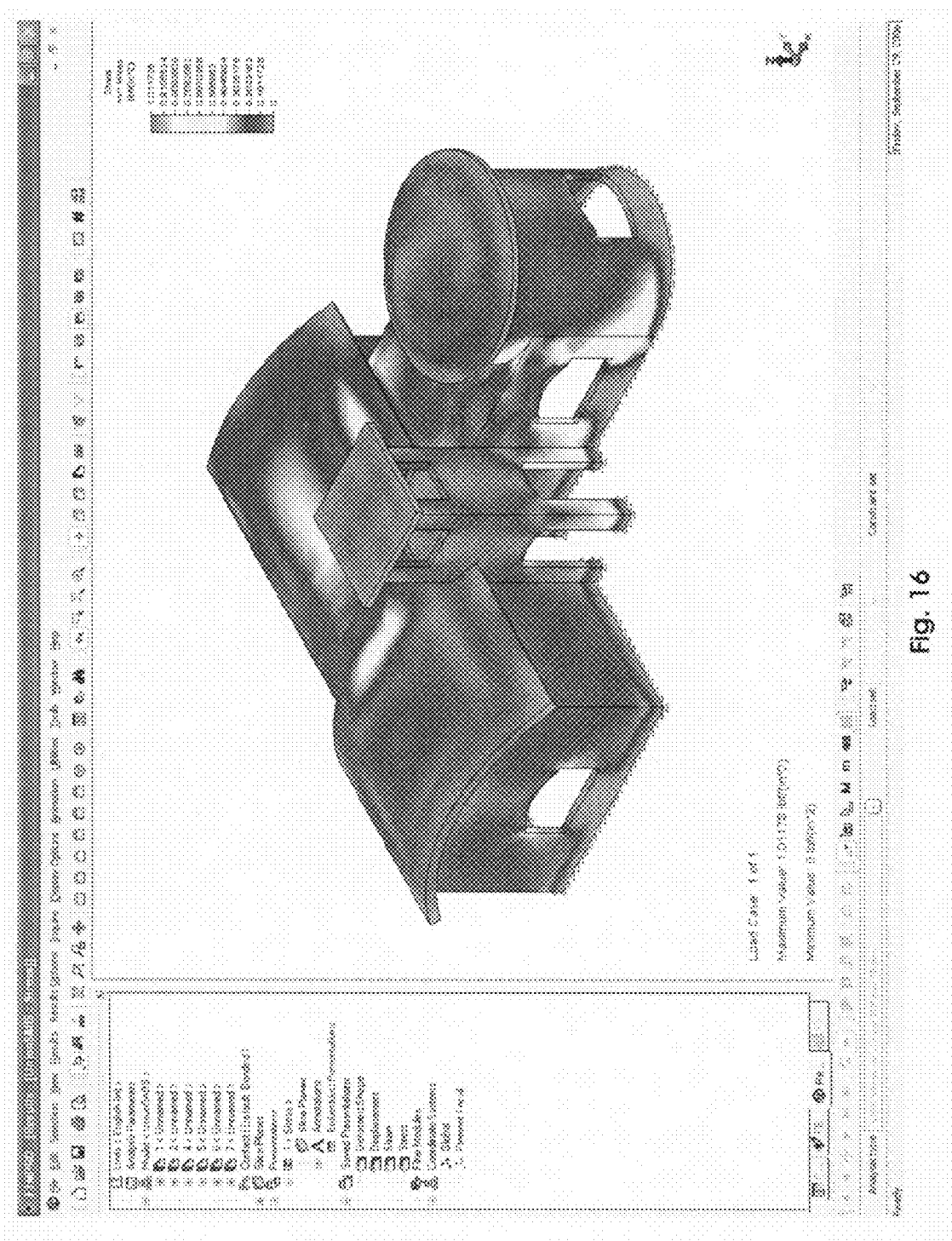

FIG. 16 shows the result of the gravity only loading in von Mises stress (pound feet per square inch) terms.

Figure 17:
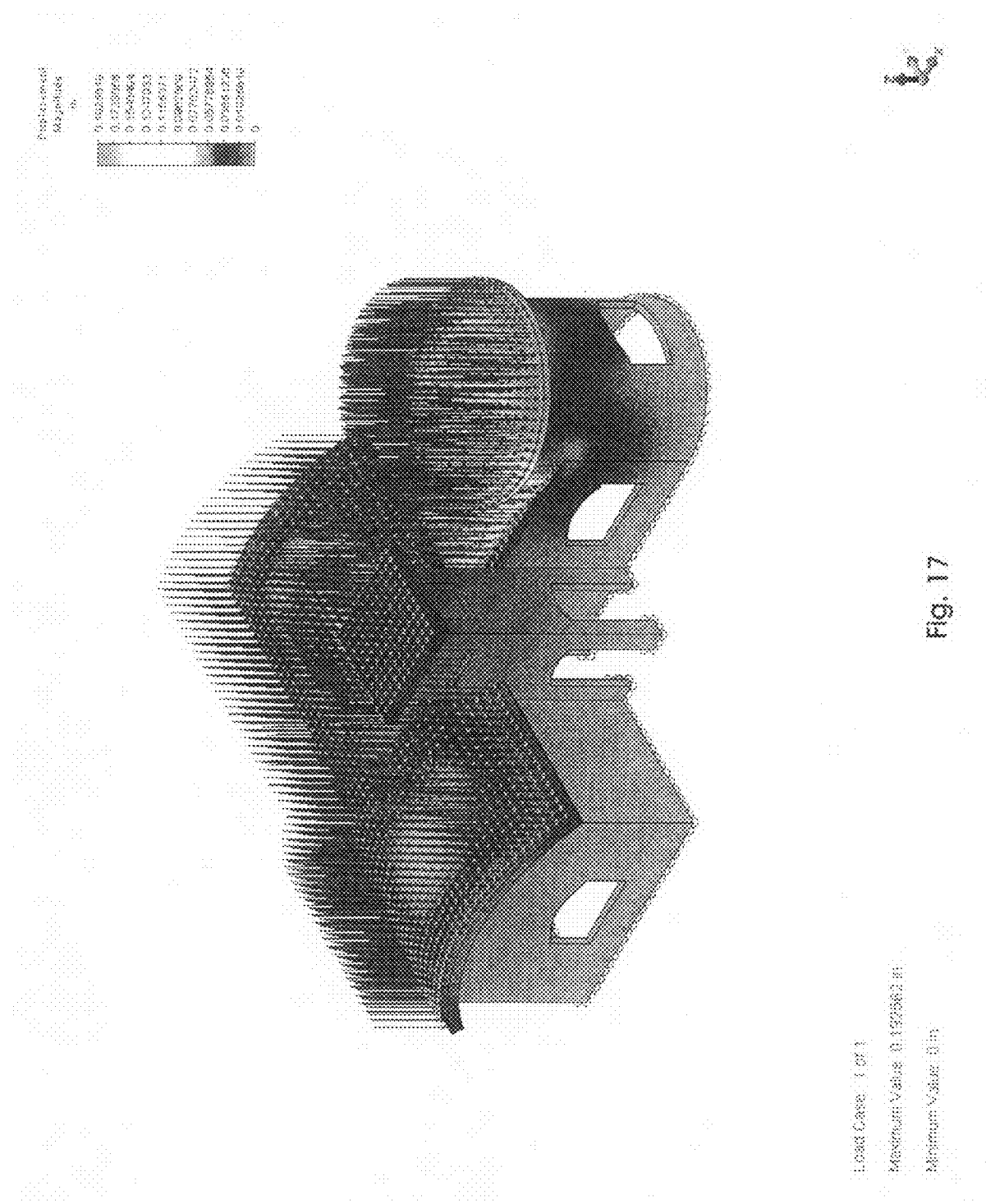

FIG. 17 shows the loading and the solution by the FEA program of a gravity loading. The FEA is shown in displacement terms.

Figure 18:
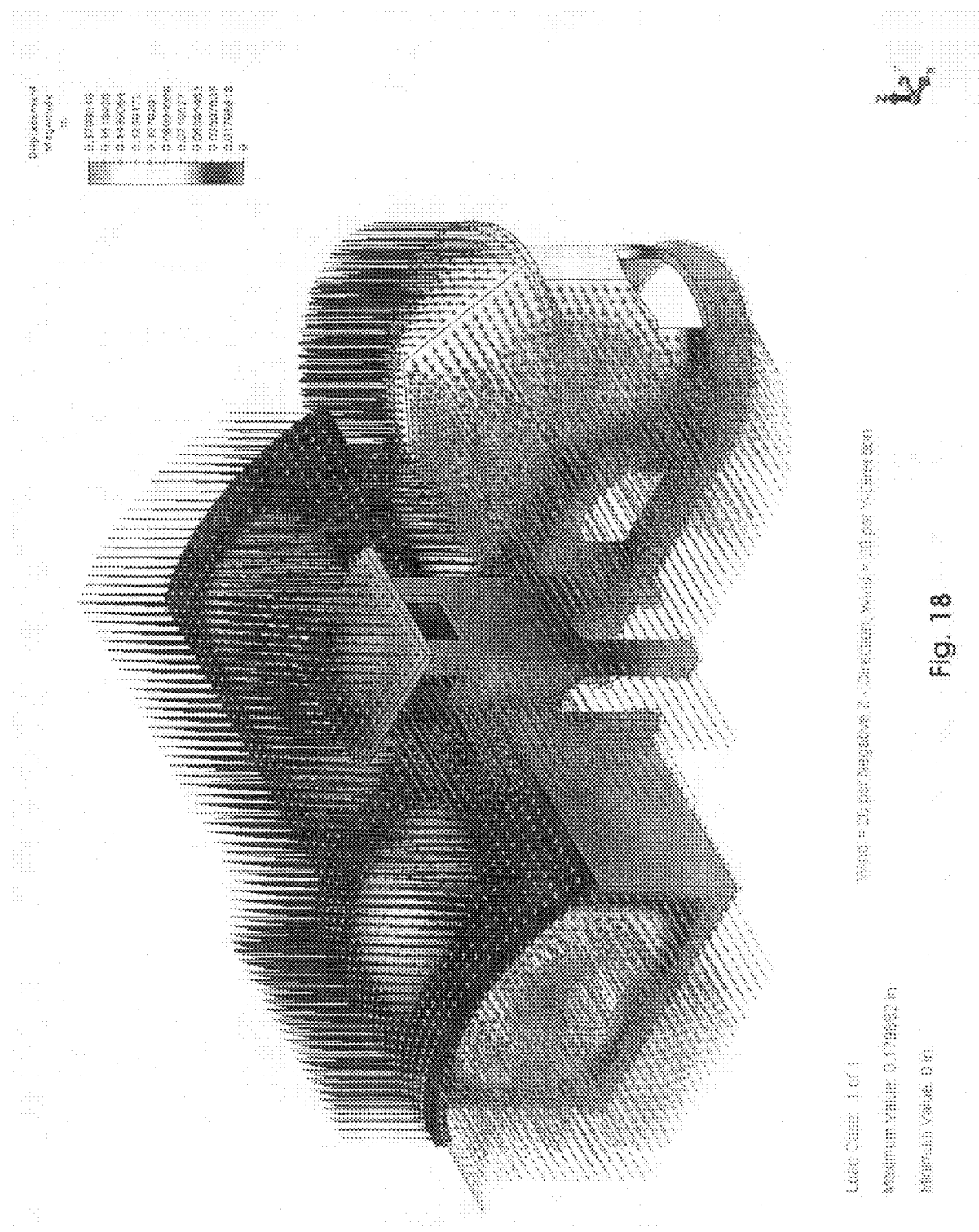

FIG. 18 shows the loading and the solution by the FEA program of a gravity, snow and wind loading in displacement terms.

Figure 19:
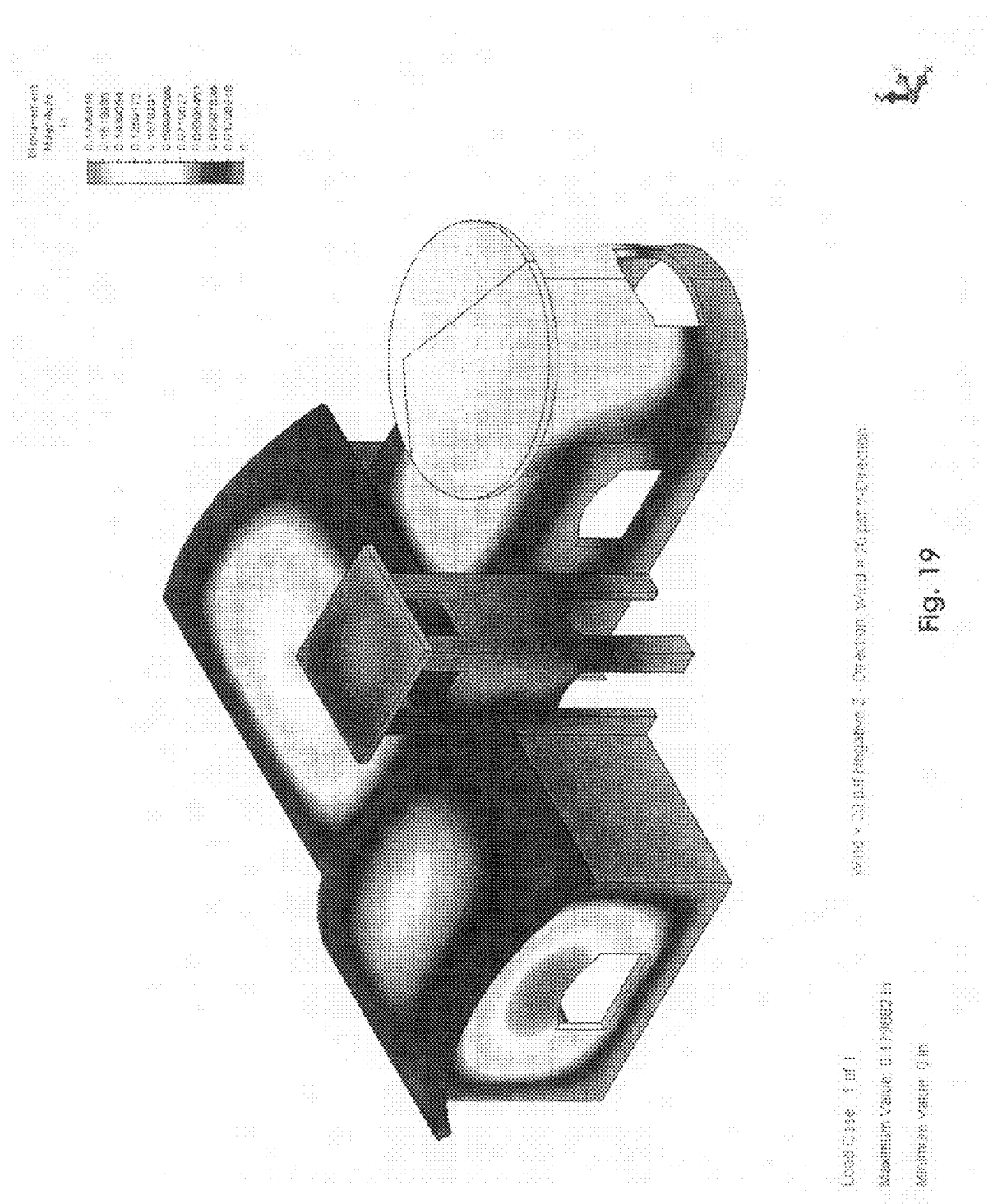

FIG. 19 shows the solution by the FEA program of a gravity, snow and wind loading in displacement terms. The loading has been removed in this figure.

Figure 20:
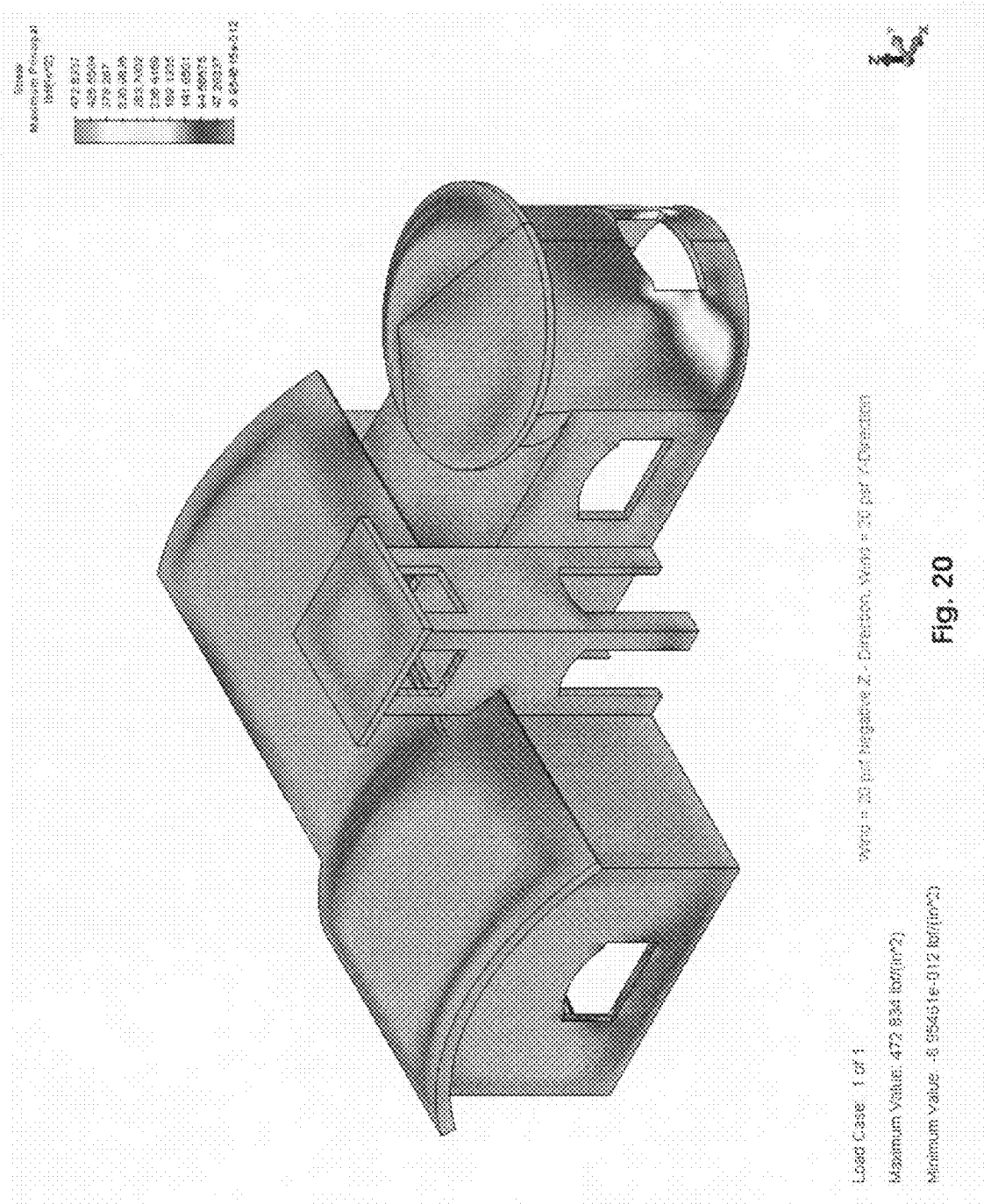

FIG. 20 shows the solution by the FEA program of a gravity, snow and wind loading in maximum principal stress (pound feet per square inch) terms. The loading has been removed in this figure.

Figure 21:
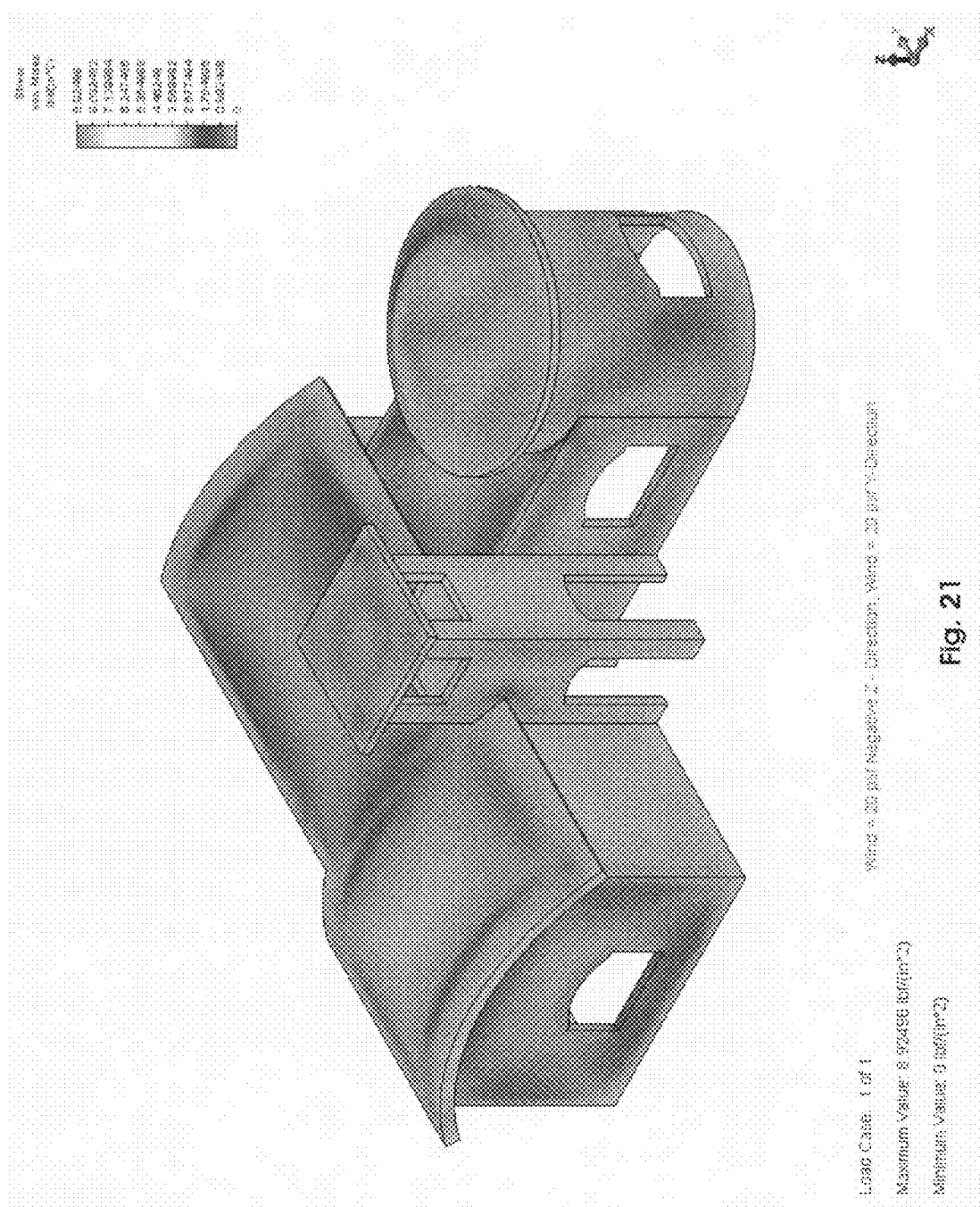

FIG. 21 shows the solution by the FEA program of a gravity, snow and wind loading in von Mises stress (pound feet per square inch) terms. The loading has been removed in this figure.

Figure 22:
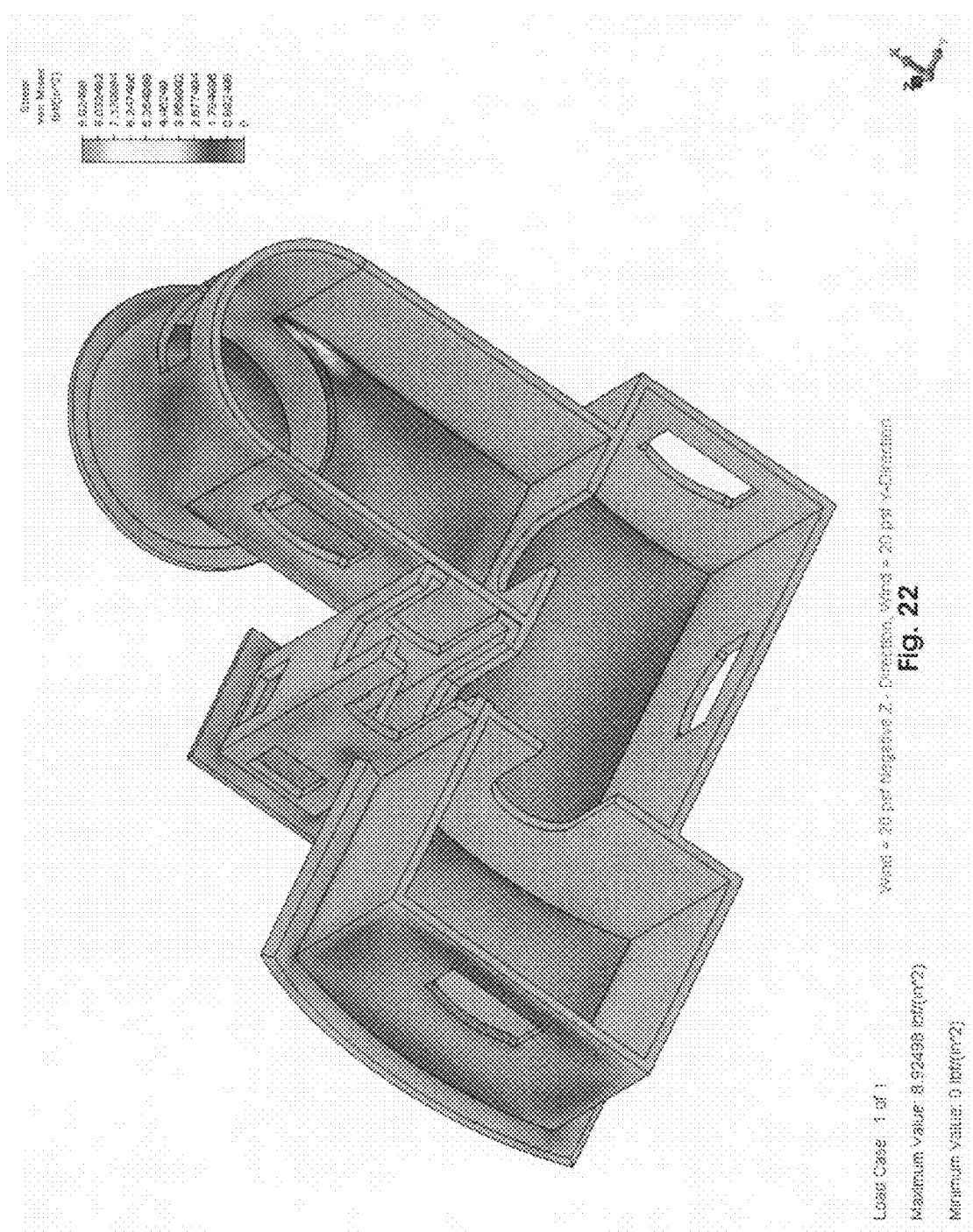

FIG. 22 shows the solution by the FEA program of a gravity, snow and wind loading in von Mises stress (pound feet per square inch) terms. The loading has been removed in this figure. The figure has been rotated to provide a bottom view.

FIG. 23 shows the solution by the FEA program of a gravity, snow and wind loading in von Mises stress (pound feet per square inch) terms. The loading has been removed in this figure. The figure has been rotated to provide a bottom view. Also, the coating has been removed to show the stress only on the core (EPS in this example).

The CAD can be broken up into parts for various other reasons than ease of manipulation, such as if the thickness or type of coating varies within in the structure, if additional coatings of different composition are added in certain areas, etc.

Various changes and modifications to the embodiments herein chosen for purposes of illustration will readily occur to those skilled in the art.

The strengthening coating on the plastic foam can be a Glass Fiber Reinforced Concrete (GFRC) or a Fiber Reinforced Polymer (FRP). The fibers can be plastic, glass, carbon, single-wall carbon nanotubes (SWNTs or Buckytubes), Aramid or other fibers. The Polymer can be Epoxies, Polyesters, Vinlyesters or other materials.

The coating also can be without fibers if the design loading is low enough. For the strongest structure, fibers should be added to the coating. The number of coats of the coating and the composition of those coats can be varied.

The type of plastic foam can be different from Expanded PolyStyrene (EPS). The EPS can have a density of 1.5 pounds per cu. ft. (nominal) which is actually 1.35 pounds per cu. ft. (actual). EPS was used because a Finite Element Analysis was done using EPS and GFRC. Suitable plastic foam could be PU, EPS, etc.

To the extent that such modifications and variations do not depart from the spirit of the invention, they are intended to be included within the scope thereof which is assessed only by a fair interpretation of the following claims.

I claim:

1. A method of analyzing a building constructed from a composite material, the composite material being formed from a selected plastic foam coated on both sides with a strengthening coating, the method comprising the following steps, creating a drawing of the building in a computer assisted drawing (CAD) program or finite element analysis (FEA) program, dividing portions of the building into a multitude of discrete volumes by lines by using an automeshing program, the volumes being constructed of lines and nodes forming mesh on the inner and outer surfaces, providing a plating of the strengthening coating on the inner and outer surface of the building by copying the inner and outer surface mesh, the copying is performed at a zero distance from the surface mesh, assigning the properties of the selected plastic foam to the discrete volumes, assigning the properties of the strengthening coating to the plating on the inner and outer surface of the building, and using the FEA program to run analyses of the effect of various loads on the building.

2. The method of claim 1 including the step of,
running analyses of static loads to be designed for.

3. The method of claim 1 including the step of,
running analyses of dynamic loads to be designed for.

4. The method of claim 1 including the step of,
running analyses of the thermal loads to be designed for.

* * * * *